United States Patent
Chen et al.

(10) Patent No.: US 12,298,270 B2
(45) Date of Patent: May 13, 2025

(54) INTEGRATED BIOLOGICAL SENSING PLATFORM

(71) Applicant: Taiwan Semiconductor Manufacturing Co., Ltd., Hsin-Chu (TW)

(72) Inventors: Tsung-Tsun Chen, Hsinchu (TW); Allen Timothy Chang, Hsinchu (TW); Jui-Cheng Huang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/232,318

(22) Filed: Aug. 9, 2023

(65) Prior Publication Data
US 2023/0384258 A1 Nov. 30, 2023

Related U.S. Application Data

(63) Continuation of application No. 17/826,882, filed on May 27, 2022, now Pat. No. 11,747,299, which is a continuation of application No. 16/441,672, filed on Jun. 14, 2019, now Pat. No. 11,360,045.

(60) Provisional application No. 62/712,697, filed on Jul. 31, 2018.

(51) Int. Cl.
*G01N 27/414* (2006.01)
*B01L 3/00* (2006.01)

(52) U.S. Cl.
CPC .... *G01N 27/4145* (2013.01); *B01L 3/502715* (2013.01); *B01L 2200/06* (2013.01); *B01L 2300/0645* (2013.01); *B01L 2400/0415* (2013.01)

(58) Field of Classification Search
None
See application file for complete search history.

(56) References Cited

U.S. PATENT DOCUMENTS

| | | | |
|---|---|---|---|
| 9,366,647 B2 | 6/2016 | Chang et al. | |
| 9,459,234 B2 | 10/2016 | Kalnitsky et al. | |
| 9,709,524 B2 | 7/2017 | Liu et al. | |
| 2008/0044893 A1 | 2/2008 | Pollack et al. | |
| 2011/0247938 A1 | 10/2011 | Wang et al. | |

(Continued)

OTHER PUBLICATIONS

B. Hadwen, et al., "Programmable large area digital microfluidic array with integrated droplet sensing for bioassays", Lab on a Chip, 12(18): p. 3305-3313 + Supplemental (Year: 2012).

(Continued)

*Primary Examiner* — J. Christopher Ball
(74) *Attorney, Agent, or Firm* — STUDEBAKER BRACKETT PLLC

(57) ABSTRACT

In an embodiment, a device includes: an electrode configured to change a contact angle of a liquid droplet above the electrode when a first voltage is applied to the electrode; a sensing film overlaying the electrode, wherein the electrode is configured for assessment of a state of the liquid droplet based on a second voltage sensed at the electrode; a reference electrode above the electrode, the reference electrode configured to provide a reference voltage; and a microfluidic channel between the electrode and the reference electrode, wherein the microfluidic channel is configured to manipulate the liquid droplet using the electrode.

20 Claims, 44 Drawing Sheets

(56) References Cited

U.S. PATENT DOCUMENTS

| | | |
|---|---|---|
| 2013/0105868 A1 | 5/2013 | Kalnitsky et al. |
| 2014/0054174 A1 | 2/2014 | Wang |
| 2014/0264468 A1 | 9/2014 | Cheng et al. |
| 2020/0166509 A1* | 5/2020 | Chia ................. G01N 15/1023 |

OTHER PUBLICATIONS

Nahar, M.M. et al., "Numerical Modeling of 3D Electrowetting Droplet Actuation and Cooling of a Hotspot," Excerpt from the Proceedings of the 2015 COMSOL Conference in Boston, pp. 1-7.
Fan, S.K. et al., "Multiphase Optofluidics on an Electro-Microfluidic Platform Powered by Electrowetting and Dielectrophoresis," Lab on a Chip, 2014, 14:2728-2738.

* cited by examiner

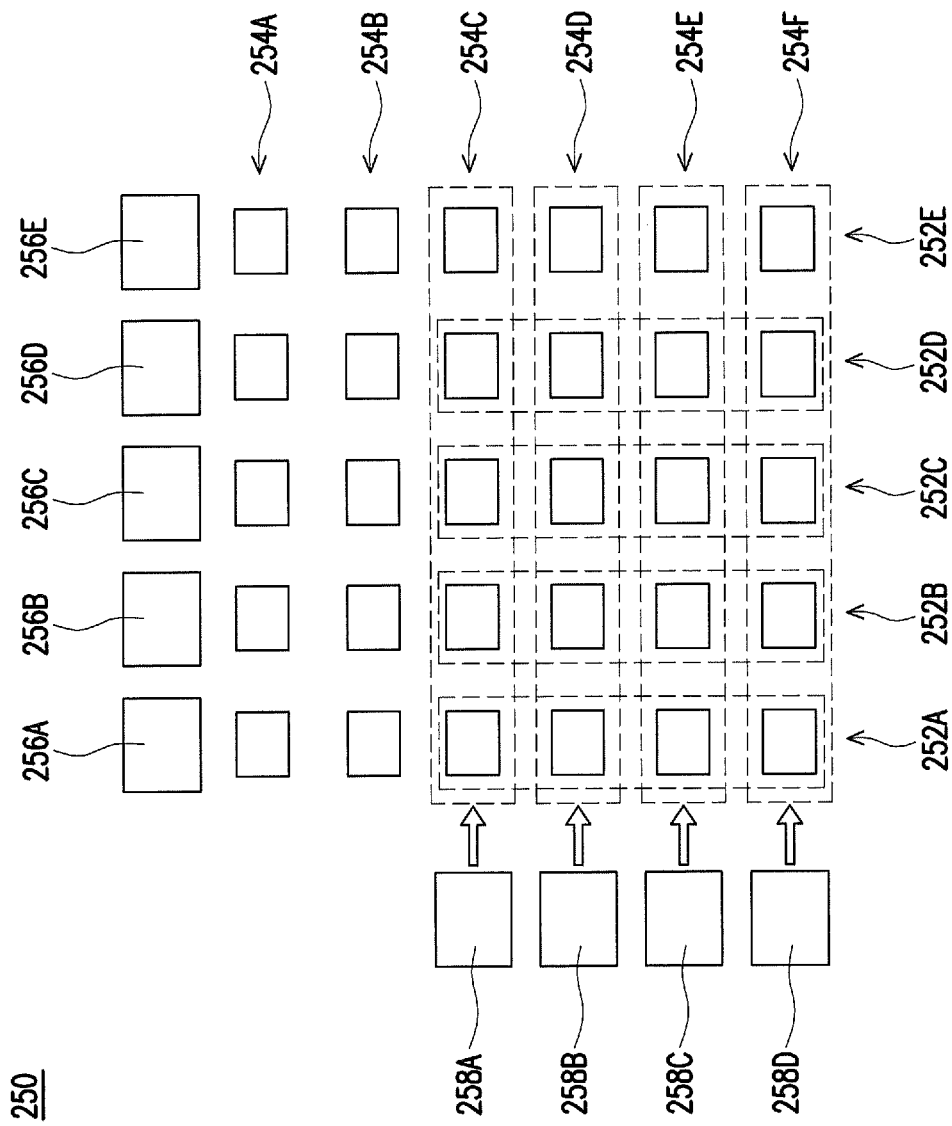

INTEGRATED BIOLOGICAL SENSING PLATFORM

CROSS-REFERENCE TO RELATED APPLICATIONS

This application is a continuation of U.S. patent application Ser. No. 17/826,882, filed May 27, 2022, now U.S. Pat. No. 11,747,299, which is a continuation of U.S. patent application Ser. No. 16/441,672, filed Jun. 14, 2019, now U.S. Pat. No. 11,360,045, which claims priority benefit of U.S. Provisional Application No. 62/712,697, filed on Jul. 31, 2018, the contents of each are incorporated by reference in their entireties.

BACKGROUND

BioFETs (biologically sensitive field-effect transistors, or bio-organic field-effect transistors) are a type of biosensor that includes a transistor for electrically sensing (e.g., assessing) biomolecules or biological entities (bio-entities). BioFETs may operate on electronic, electrochemical, optical, and mechanical detection principles. For example, BioFETs may electrically sense charges, photons, and mechanical properties of bio-entities or biomolecules. The detection can be performed by detecting the bio-entities or biomolecules themselves, or through interaction and reaction between specified reactants and bio-entities/biomolecules. Semiconductor processes can be used to manufacture BioFETs that quickly convert biological signals to electric signals. These BioFETs can be easily applied to integrated circuits (ICs) and micro-electro-mechanical systems (MEMS). However, BioFETs may have challenges due to, for example, compatibility issues between the semiconductor fabrication processes, the biological applications, restrictions and/or limits on the semiconductor fabrication processes, integration of the electrical signals and biological applications, and/or other challenges arising from implementing a large scale integration (LSI) process.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 2F is a diagram of a microfluidic grid for transporting and mixing target bio-entities or molecules in accordance with some embodiments.

FIGS. 6B, 6C, 6D, 6E, 6F, 6G, 6H, and 6I illustrate cross-sectional views of an exemplary integrated electrode during various fabrication stages, made by the method of FIG. 6A, in accordance with some embodiments.

FIGS. 7B, 7C, 7D, 7E, 7F, 7G, 7H, 7I, 7J, and 7K illustrate cross-sectional views of an exemplary integrated electrode during various fabrication stages, made by the method of FIG. 6A, in accordance with some embodiments.

DETAILED DESCRIPTION OF EXEMPLARY EMBODIMENTS

Figure 1A:
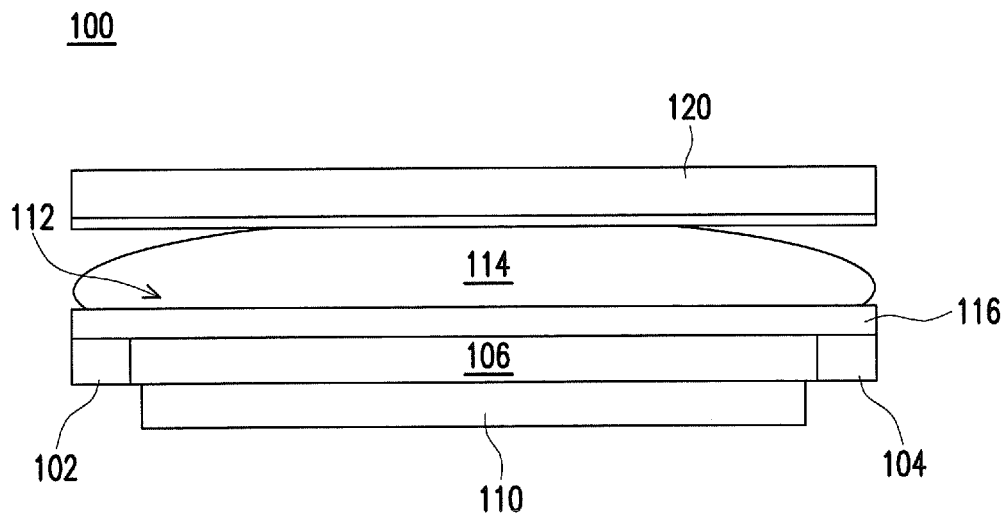
FIG. 1A illustrates an integrated electrode when operating as a bioFET, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and methods in accordance with various embodiments are directed to an integrated biological sensing platform for biological signal detection in a system on a chip. The integrated biological sensing platform may include integrated electrodes that integrates a dual function as both electrowetting electrodes and biological electrical field effect transistors (bioFET) sensors. These integrated electrodes may be controlled by control circuitry. This control circuitry may control the integrated electrodes so that the liquid droplets may be manipulated and moved over the top of the integrated electrodes. In certain embodiments, the control circuitry may include a switch (e.g., a metal oxide semiconductor field effect transistor (MOSFET) switch) to control the integrated electrodes and/or other electrical components of the integrated biological sensing platform. In addition, the integrated biological sensing platform may include a dielectric sensing film covering the top of the integrated electrode. In certain embodiments, the integrated biological sensing platform may include a heater, a thermal sensor, and/or other sensors utilized to monitor aspects of the integrated biological sensing platform. In various embodiments, an integrated electrode may be implemented as a transistor (e.g., a transistor that functions as a conductor).

FIG. 1A illustrates an integrated electrode 100 when operating as a bioFET (e.g., when operating in a bioFET sensing mode), in accordance with some embodiments. The integrated electrode 100 may include source/drain regions (e.g., source region 102 and drain region 104) and a channel region 106 formed in a semiconductor active layer. The integrated electrode may also include a gate 110. The gate 110 may function also as an electrowetting electrode (e.g., when the integrated electrode 100 is in an electrowetting driving mode), as will be discussed further below.

In certain embodiments, fluid over the channel region 106 may form a fluid gate 112. The fluid gate 112 may effect channel formation in the channel region between the source drain regions 102, 104 in a manner that is not directly controlled by a controller that applies voltage to the gate 110. For example, the fluid gate 112 may effect channel formation between the source region 102 and the drain region 104, which may be sensed as a current across the channel region 106 and/or a voltage potential difference between the source region 102 and the drain region 104.

In some embodiment, the gate 110 may be made of polysilicon. In some other embodiments, the gate 110 may be made of a metal. In some embodiments, a gate dielectric may separate the gate 110 from the channel region 106. Such a gate dielectric may be made of SiO2 or a high-k dielectric.

The fluid gate 112 may interface with a dielectric sensing film 116. Accordingly, the dielectric sensing film 116 is exposed for contacting with fluid (e.g., droplet 114). The fluid gate 112 may be operative to modulate the source region 102 to drain region 104 conductivity of the integrated electrode 100 when contacted by a droplet 114 having a suitable composition or carrying specific analytes. In some embodiments, dielectric sensing film 116 is the surface of an ion sensing film. Examples of materials for a dielectric sensing film 116 that provide the functionality of an ion sensing film include: HfO2, SiO2, Si3N4, Al2O3, AlO2, and Ta2O5. Ion sensing films may become charged when brought in proximity with, or in contact with an aqueous solution having a suitable ion concentration. Moreover, the ion sensing film can become sufficiently charged to switch the source region 102 to drain region 104 conductivity of the integrated electrode 100. In some embodiments, the dielectric sensing film 116 may facilitate detection of whether or not a solution is above or below a critical pH.

In some embodiments, the dielectric sensing film 116 includes a coating of a selective binding agent. A selective binding agent is a biological composition having the property of selectively binding with a particular analyte. Many biological molecules and structures are charged. If a sufficient concentration of the analyte is bound on the dielectric sensing film 116, the overall charge concentration at the dielectric sensing film 116 can become sufficient to modulate the source region 102 to drain region 104 conductivity of the integrated electrode 100. In some embodiments, the selective binding agent includes an antibody. In some embodiments, the selective binding agent includes a single stranded nucleic acid. In some embodiments, the selective binding agent includes an epitope that is the target of certain antibodies.

In some embodiments, the dielectric sensing film 116 is above (e.g., overlaying) the channel region 106. In further embodiments, a passivation layer may be located in an area that is not above the channel region 106. Covering areas of dielectric sensing film 116 that are not directly above the channel regions 106 can prevent analytes from binding in regions where they have little or no effect on the conductivity of channel region 106. Analytes may thereby be concentrated where they are effective for modulating the source region 102 to drain region 104 conductivity of the integrated electrode 100.

In some embodiments, the dielectric sensing film 116 is approximately 2 μm or less in thickness. A thickness of 2 μm or less may be desirable to achieve local heating using heating elements proximate to the integrated electrode 100. In some embodiments, the dielectric sensing film 116 is approximately 100 nm or less in thickness. A thickness of 100 nm or less can make local heating more effective. In some embodiments, the dielectric sensing film 116 is very thin. In this context, approximately 3 nm or less is considered. A very thin dielectric sensing film 116 may increase the sensitivity of the integrated electrode 100. In particular embodiments, the dielectric sensing film 116 may be from about 10 angstroms to about 20 angstroms in thickness.

In particular embodiments, the dielectric sensing film 116 may function as a hydrophobic layer facing the droplet 114. In such embodiments, the hydrophobic layer aspect of the dielectric sensing film 116 may include a self-assembled monolayer or a polytetrafluoroethylene layer.

In various embodiments, the integrated electrode 100 may include a top electrode 120 (also referred to as a reference electrode). The top electrode may be charged as desired to facilitate the sensing and/or modulation of conductivity across the source region 102 and drain region 104. In certain embodiments, the top electrode may be a proxy for the fluid gate 112 such that application and/or sensing of voltage at the fluid gate 112 may be performed at the top electrode 120.

Figure 1B:
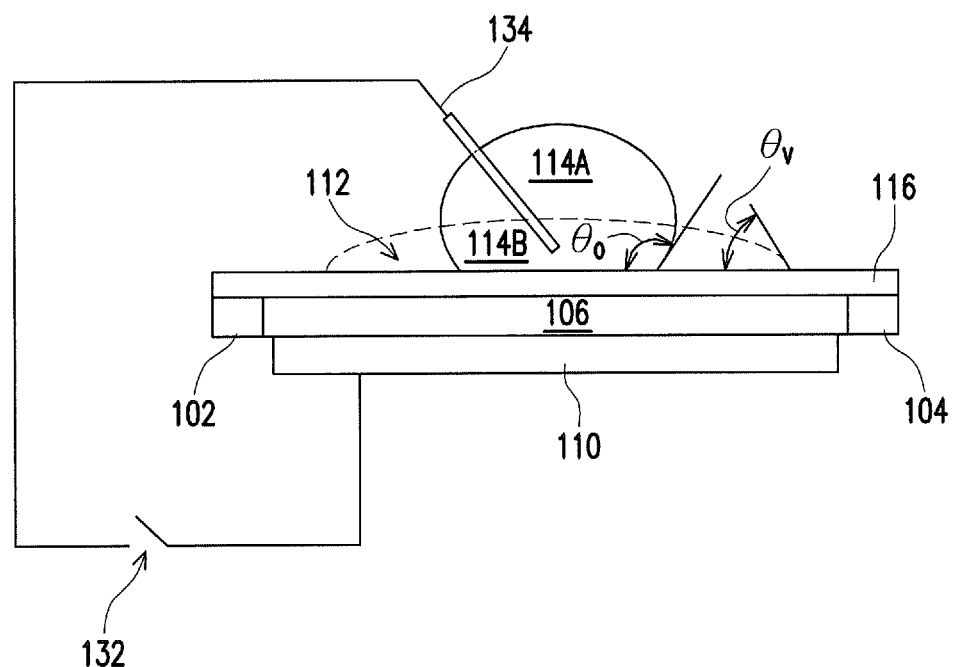
FIG. 1B is a cross sectional diagram of the integrated electrode in operation as an electrowetting electrode for electrowetting, in accordance with some embodiments.

FIG. 1B is a cross sectional diagram of the integrated electrode 100 in operation as an electrowetting electrode (e.g., in an electrowetting driving mode), in accordance with certain embodiments. The gate 110 may be below the channel region 106, which may be below the dielectric sensing film 116. Also, as noted above, the dielectric sensing film 116 may be hydrophobic in certain embodiments. The gate 110 may be coupled to a variable voltage source. The gate may be attached to a probe 134 via a switch 132. In certain embodiments, the probe may represent the voltage applied to the gate 110. The probe 134 may be applied to the droplet 114A, 114B shown in two different states. Droplet 114A depicts the droplet in a state when no voltage is being applied by the probe 134. Because of the hydrophobic coating of the dielectric sensing film 116, droplet 114A has a contact angle θ0 as shown. However, by applying a voltage from the voltage source through the probe 134, the contact angle can be decreased and the contact area increased. Thus, the droplet 114B is the droplet when a voltage is applied. The contact angle is then decreased to θv, bringing the mass of the droplet 114B closer to the underlying gate 110. The change in the contact angle caused by the applied voltage is related to the applied voltage according to equation (1) below.

$$\cos\theta = \cos\theta_0 + \frac{1}{\gamma_{SL}} \cdot \frac{\varepsilon_r \varepsilon_0}{2t} V^2 \quad (1)$$

In equation (1), V is the applied electrical potential or voltage, θv is the contact angle under applied voltage V, and θ0 is the contact angle without applied voltage V. Other variables include: E, the dielectric constant of the dielectric layer; $\varepsilon 0$, the vacuum permittivity; γLG, the surface tension; and t, the thickness of the channel region 106. This manipulation of the apparent hydrophobicity of the droplet in integrated electrode 100 may be referred to as electrowetting-on-dielectric (EWOD). Thus, by using EWOD, the physical configuration of a droplet on a hydrophobic surface can be altered and controlled.

Figure 1C:
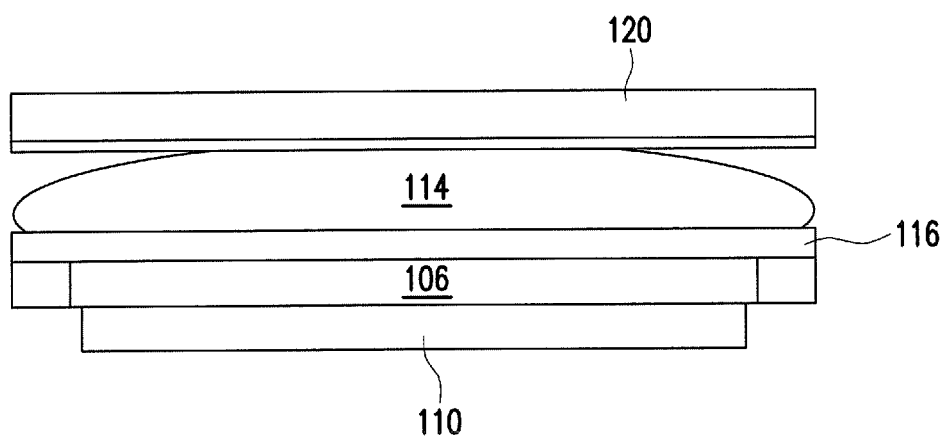
FIG. 1C is a simplified diagram of the integrated electrode when the gate functions as an electrowetting electrode, in accordance with some embodiments.

FIG. 1C is a simplified diagram of the integrated electrode 100 when the gate functions as an electrowetting electrode (e.g., in an electrowetting driving mode), in accordance with various embodiments. As illustrated in FIG. 1C, the gate 110 may function as an electrowetting electrode. The channel region 106 may function as a dielectric layer above the gate. The dielectric sensing film 116 may function as a hydrophobic layer. Also, the top electrode 120 may be grounded (e.g., at a common ground reference voltage).

Figure 1D:
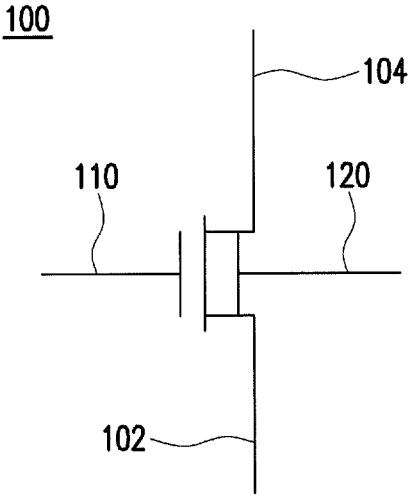
FIG. 1D illustrates a circuit representation of the integrated electrode when utilized for electrowetting or as a bioFET, in accordance with some embodiments.

FIG. 1D illustrates a circuit representation of the integrated electrode 100 when utilized for electrowetting (e.g., when the integrated electrode 100 is in an electrowetting driving mode) or as a bioFET (e.g., when the integrated electrode 100 is in a bioFET sensing mode), in accordance with some embodiments. As noted above, the integrated electrode 100 may include a source region 102, a drain region 104, a gate 110, and a top electrode 120. In performance of sensing as a bioFET, a source voltage (VS) may be applied and/or sensed at the source region 102, a drain voltage (VD) may be applied and/or sensed at the drain region 104, a gate voltage (VP) may be applied and/or sensed at the gate 110, and a fluid gate voltage (VFG) may be applied and/or sensed at the top electrode 120. Accordingly, the bioFET may perform sensing or assessment (e.g., sensing of a location of a droplet or the composition of a droplet) by determining changes in the voltages VS, VD, VP, and/or VFG.

In contrast, in performance of electrowetting as an electrowetting electrode (e.g., in an electrowetting driving mode), an electrowetting voltage (Vewod) may be applied to the gate 110 and a ground voltage may be applied at the top electrode 120. The electrowetting voltage (Vewod) may be a voltage level sufficient to change the hydrophobicity of a droplet above the integrated electrode 100. The electrowetting voltage (Vewod) may differ based on the size of the integrated electrode 100 as well as the size and/or composition of the droplet above the integrated electrode 100. In particular embodiments in performance of electrowetting as an electrowetting electrode, an electrowetting voltage (Vewod) may be applied at the source region 102, the electrowetting voltage (Vewod) may be applied at the drain region 104, the electrowetting voltage (Vewod) may be applied at the gate 110, and a ground voltage may be applied at the top electrode 120.

Figure 2A:
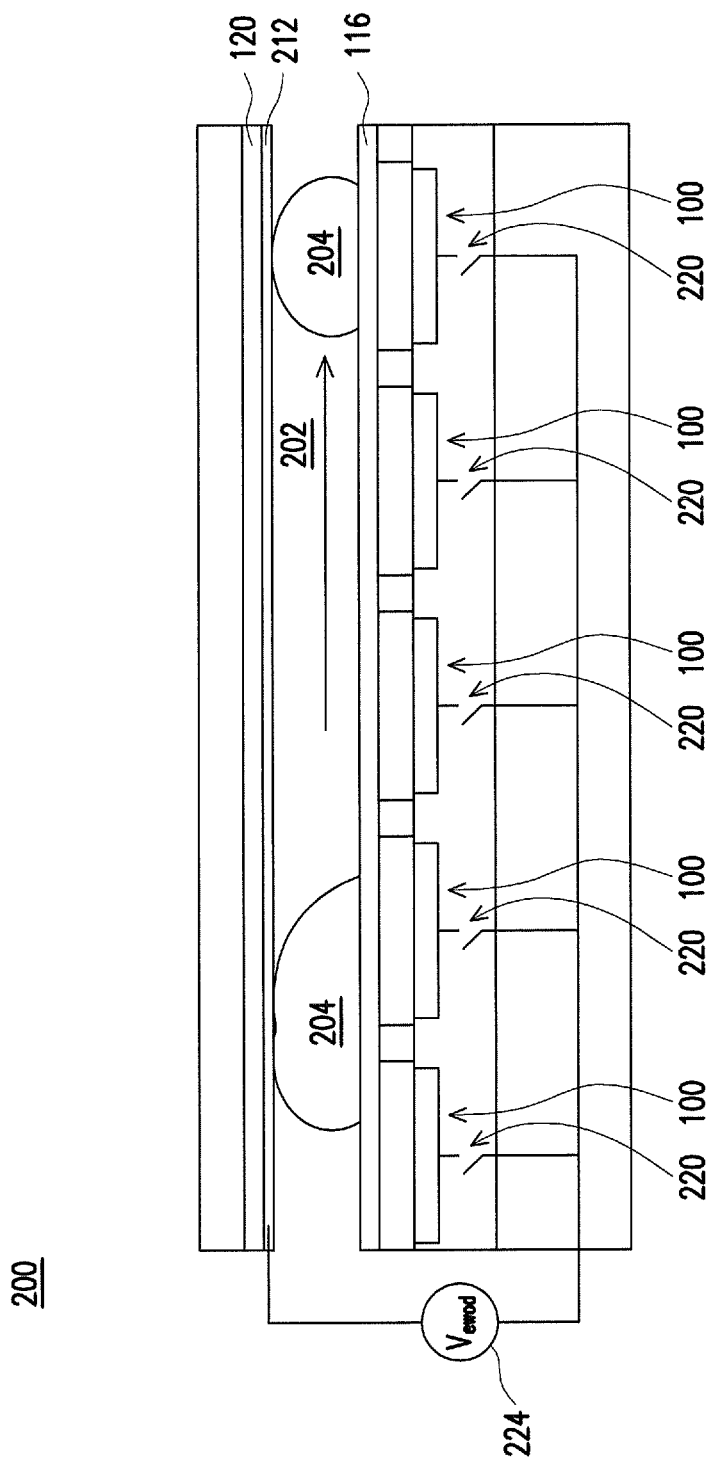
FIG. 2A is a cross-sectional diagram of an integrated biological sensing platform that allows for transporting and manipulating bio-entity sample droplets using EWOD principles, in accordance with some embodiments.

FIG. 2A is a cross-sectional diagram of an integrated biological sensing platform 200 that allows for transporting and manipulating bio-entity sample droplets using EWOD principles, in accordance with various embodiments. The integrated biological sensing platform 200 operates around a microfluidic channel 202 to control a droplet 204 within the channel 202. The droplet 204 may be a bio-entity sample droplet. A bio-entity or biological entity may refer to DNA, RNA, a protein, a small molecule, a virus or other pathogen, or any such thing that may be sequenced, identified, or quantified. Such activities may take place in a medical or industrial context. In certain embodiments, the example of DNA sequencing is presented; however, the embodiments are not limited to this example.

The bottom portion of the microfluidic channel may include gates, channel regions, and dielectric sensing film associated with five integrated electrodes 100. As illustrated, the dielectric sensing film may be continuous across each of the integrated electrodes 100, but the portion of the continuous dielectric sensing film 116 directly over a respective channel region may be the dielectric film associated with the integrated electrode of the respective channel region. Also, as noted below, the dielectric sensing film 116 may have hydrophobic properties in certain embodiments to also act as a hydrophobic layer.

The top surface of the microfluidic channel 202 is provided by a top hydrophobic layer 212. The top hydrophobic layer 212 may abut a top electrode 120, which forms the top surface of the microfluidic channel 202. Thus, the droplet 204 is physically bounded by the dielectric sensing film 116 on the bottom and the top hydrophobic layer 212 on the top. For simplicity of illustration, the top electrode 120 may be illustrated as being continuous. However, the portion of the top electrode 120 directly over a respective channel region may be referred to as the top electrode 120 associated with the integrated electrode of the respective channel region.

The gates of the respective integrated electrodes 100 are each coupled to a respective switch 220 capable of selecting any combination of respective gates. The switches 220 are in turn connected to a voltage source 224, the opposite side of which is connected to the top electrode 120. By selectively applying a voltage to various combinations of gates of respective integrated electrodes 100, the electric field in which the droplet 204 is located can be altered. In the depicted embodiment a DC potential is applied, but in other embodiments, an AC potential may be used instead. By controlling the electric fields between the gates and the top electrode 120, the droplet 204 itself can be manipulated and transported in various ways.

Figure 2B:
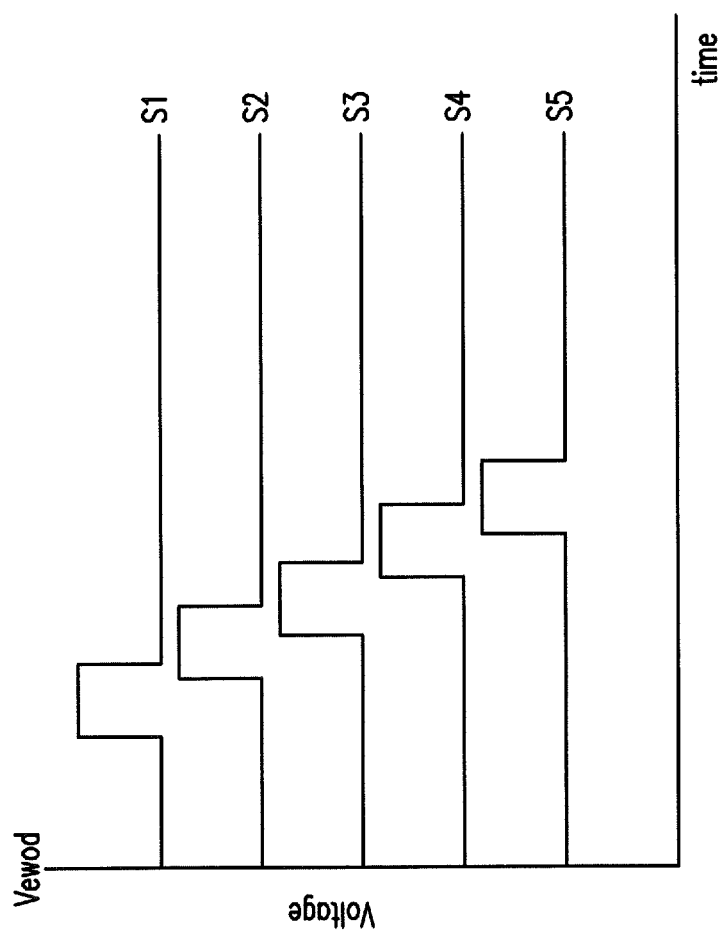
FIG. 2B illustrates a plot of voltage over time for the different gates of respective integrated electrodes, in accordance with some embodiments.
Figure 2D:
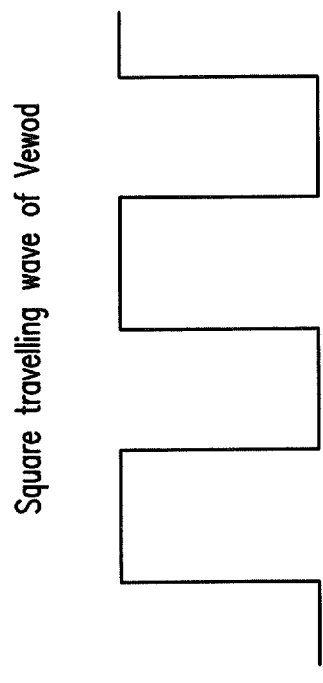
FIG. 2D illustrates a plot of voltage over time of the electrowetting voltage (Vewod) as a square wave, in accordance with some embodiments.
Figure 2C:
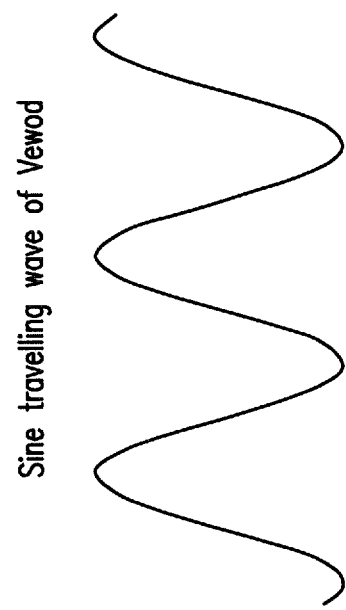
FIG. 2C illustrates a plot of voltage over time of the electrowetting voltage (Vewod) as a sine wave, in accordance with some embodiments.

FIG. 2B illustrates a plot of voltage over time for the different gates of respective integrated electrodes 100, in accordance with certain embodiments. As illustrated, the electrowetting voltage (Vewod) may be applied sequentially over the different gates at different times to move a droplet from one integrated electrode to another. Although the plot of voltage over time may be a square wave, in certain embodiments the plot of voltage over time of the electrowetting voltage (Vewod) may be a sine wave as illustrated in FIG. 2C. Also, the plot of voltage over time of the electrowetting voltage (Vewod) may be a continuous square wave as illustrated in FIG. 2D.

Figure 2E:
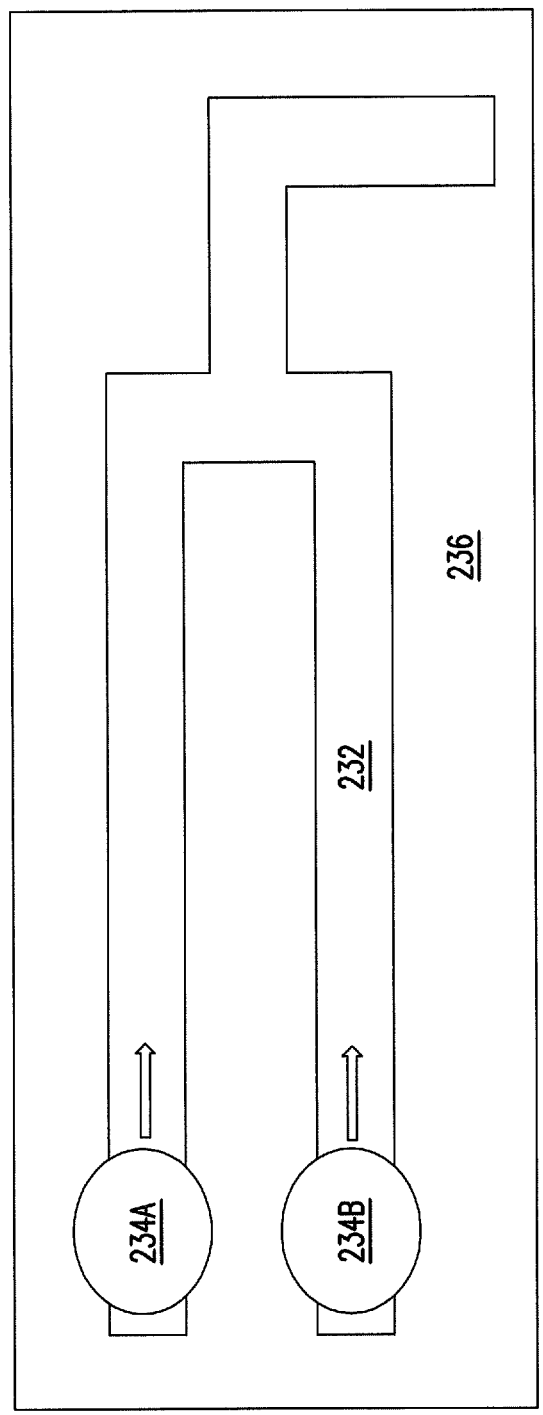
FIG. 2E is a plan view of an integrated biological sensing platform that allows for transporting and manipulating bio-entity sample droplets using EWOD principles along path or microfluidic channel, in accordance with some embodiments.

FIG. 2E is a plan view of an integrated biological sensing platform 230 that allows for transporting and manipulating bio-entity sample droplets using EWOD principles along path or microfluidic channel 232, in accordance with various embodiments. The various integrated electrodes of the integrated biological sensing platform 230 may be configured to control droplets 234A, 234B along the microfluidic channel 232. Also, the various integrated electrodes may cover a particular area 236 such that the area covered by the various integrated electrodes. When the various integrated electrodes function as a bioFET (e.g., in a bioFET sensing mode), the area may be utilized for electrically sensing biomolecules or bio-entities based on the controlled droplets 234A, 234B.

FIG. 2F is a diagram of a microfluidic grid 250 for transporting and mixing target bio-entities or molecules. For example microfluidic grid 250 may be used for transporting and mixing target DNA samples and biological reagents. The microfluidic grid 250 includes a plurality of horizontal and vertical paths lined by integrated electrodes (e.g., gates of respective integrated electrodes). Selective activation of the gates (e.g., to the electrowetting voltage (Vewod)) may be used to move, split, merge, and form droplets in the microfluidic grid 25

The plurality of vertical paths is labeled as vertical paths 252A-E, while the plurality of horizontal paths is labeled as horizontal paths 254A-F. Each of vertical paths 252A-E and each of horizontal paths 254A-F may be formed from a plurality of linearly arranged integrated electrodes. The spaces in between the vertical paths 252A-E and the horizontal paths 254A-F may be empty space to effectively bar a droplet from "jumping" from one hydrophilic path to another with electrodes in an ON state (e.g., a gate of an integrated electrode connected to a voltage source at the electrowetting voltage (Vewod)). The ON state may be contrasted with an OFF state (e.g., a gate of an integrated electrode disconnected from the voltage source at the electrowetting voltage (Vewod)). In some embodiments, material barriers exist in the spaces between the paths.

The microfluidic grid 250 also includes a plurality of reservoirs from which droplets are introduced into the plurality of paths. Arranged along the top are a number of reagent reservoirs 256A-E. For example, these reagent reservoirs may include an adenine reagent reservoir 256A, a thymine reagent reservoir 256B, a guanine reagent reservoir 256C, a cytosine reagent reservoir 256D, and a buffer reservoir 256E. Other embodiments of microfluidic grid 250 may include other biological reagents.

Depicted on the left-hand side of microfluidic grid 250 is a number of bio-entity sample reservoirs 258A-D. In the depicted embodiment, used for DNA sequences, each bio-entity sample reservoir contains a different target DNA fragment. For example, the bio-entity sample reservoirs 258A-D may each include a DNA sample to be sequenced. In embodiments used for diagnosis, other types of bio-entity samples, such as antibodies, may be present in the bio-entity sample reservoirs 258A-D.

Droplets may be dispensed into the microfluidic grid 250 from the bio-entity sample reservoirs 258A-D and/or the reagent reservoirs 256A-E through vertical paths 252A-E and horizontal paths 254A-F by selectively asserting the electrodes that make up the horizontal and vertical paths. Thus, these droplets may be positioned at any location in the microfluidic grid 250 and divided and mixed, or merged, with other droplets.

Figure 3A:
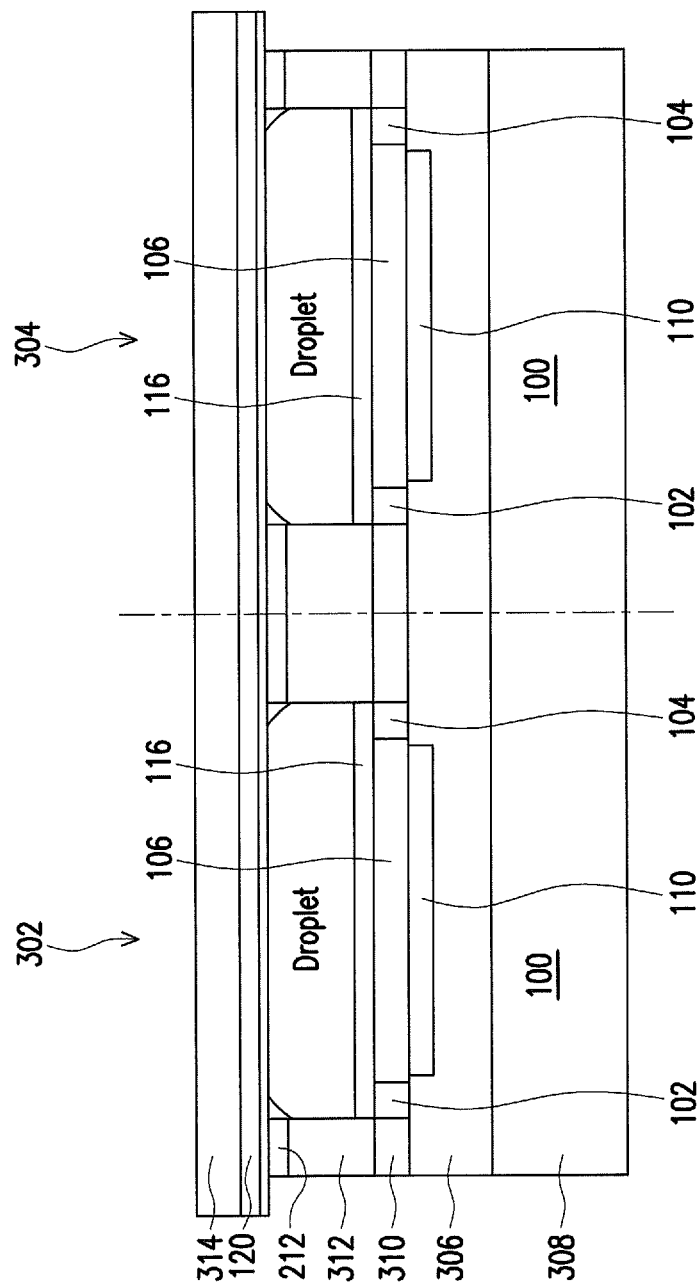
FIG. 3A illustrates a side by side comparison of the integrated electrode, introduced above, in an electrowetting driving mode and in a bioFET sensing mode, in accordance with some embodiments.

FIG. 3A illustrates a side by side comparison of the integrated electrode 100, introduced above, in an electrowetting driving mode 302 and in a bioFET sensing mode 304, in accordance with various embodiments. The integrated electrode 100 may be formed in various layers, such as where the gate 110 may be formed in an inter dielectric layer (IDL) 306 above a handling substrate 308. The handling substrate may be made of silicon. The IDL layer 306 may be made of a metal, SiO2, or interlayer dielectrics. Then, the source region 102, channel region 106, and the drain region 104 may be formed in a silicon (Si) or a silicon oxide (SiO2) layer 310 (e.g., a semiconductor active layer). A buried oxide (BOX) layer 312 may be formed over the Si or SiO2 layer 310. The BOX layer may be formed as an SiO2 isolation layer. The BOX layer 312 may be etched to form a channel or opening for droplet manipulation (e.g., movement). Also, the dielectric sensing film 116 may be disposed underneath the droplet and over the source region 102, channel region 106, and drain region 104. The BOX layer 312 may abut the hydrophobic layer 212, a top electrode 120, and a glass substrate bonding layer 314. Accordingly, the physical structure of the integrated electrode 100 may be the same when in either the electrowetting driving mode 302 or in the bioFET sensing mode 304.

As noted above, the integrated electrode 100 may be operated in an electrowetting driving mode 302 and alternatively in a bioFET sensing mode 304. For example, the integrated electrode may be operated in an electrowetting driving mode by applying an electrowetting voltage (Vewod) (e.g., from an electrowetting voltage source) at least to the gate 110 and optionally to each of the gate 110, source region 102, and the drain region 104. Also, in the electrowetting driving mode, the top electrode 120 may be set to ground.

The integrated electrode may be operated in a bioFET sensing mode by not applying the electrowetting voltage (Vewod) and/or not having the top electrode 120 set to ground. Rather, the integrated electrode may be operated in a bioFET sensing mode rather by sensing for voltage and/or current changes at any of the gate 110 (e.g., as VP, discussed above), source region 102 (e.g., as VS, discussed above), drain region 104 (e.g., as VD, discussed above), and/or top electrode 120 (e.g., as VFG, discussed above).

Figure 3B:
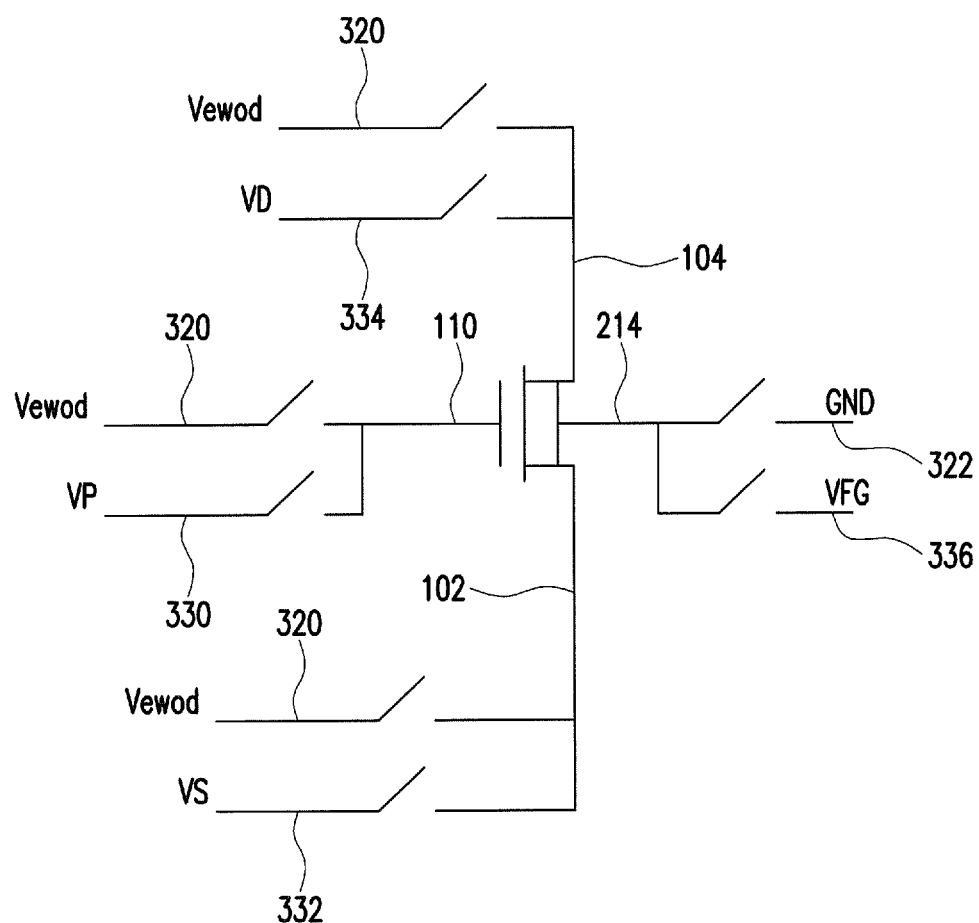
FIG. 3B is a circuit diagram of the same integrated electrode operated in either an electrowetting driving mode or alternatively in a bioFET sensing mode, in accordance with some embodiments.

FIG. 3B is a circuit diagram of the same integrated electrode operated in either an electrowetting driving mode 302 or alternatively in a bioFET sensing mode, in accordance with certain embodiments. When the integrated electrode is operated in an electrowetting driving mode, the switches associated with the electrowetting voltage (Vewod) 320 (e.g., from an electrowetting voltage source) may be closed at least to the gate 110 and optionally to each of the gate 110, source region 102, and the drain region 104. Also, when the integrated electrode 100 is operated in an electrowetting driving mode, the switches associated with the top electrode 120 may be set to ground 322. Alternatively, when the integrated electrode is in a bioFET sensing mode, the switches associated with sensing for voltage and/or current changes at any of the gate 110 (e.g., as VP 330, discussed above), source region 102 (e.g., as VS 332, discussed above), drain region 104 (e.g., as VD 334, discussed above), and/or top electrode 120 (e.g., as VFG 336, discussed above) may be closed.

Figure 4:
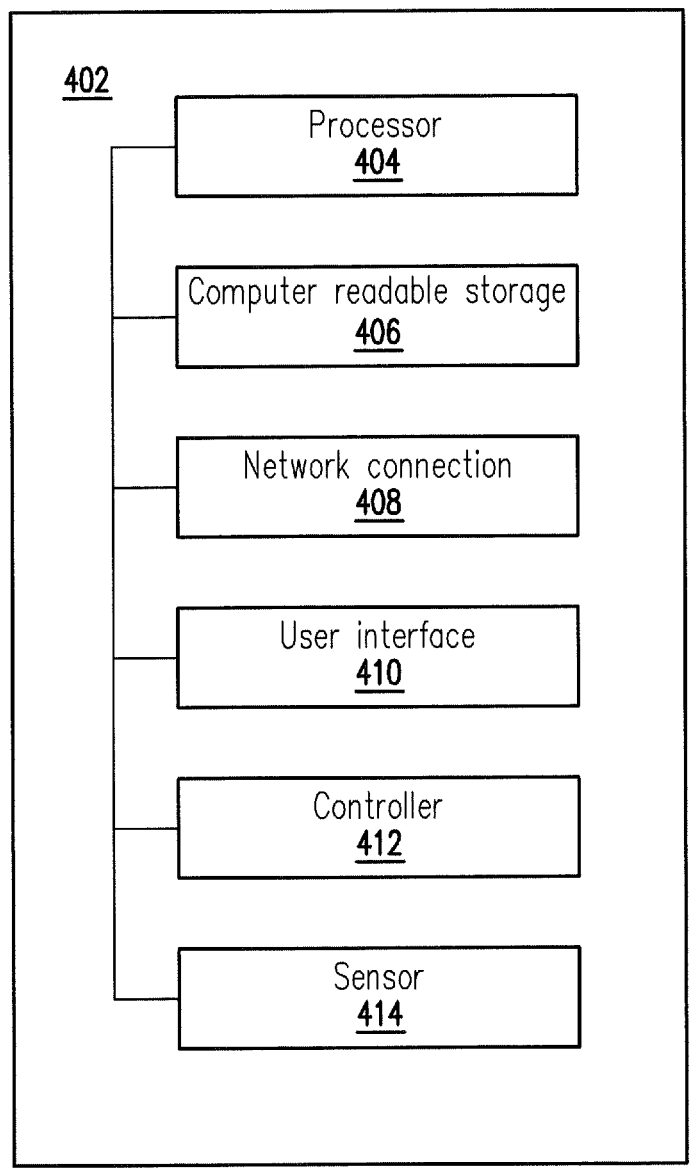
FIG. 4 is a block diagram of various functional modules of an integrated biological sensing platform, in accordance with some embodiments.

FIG. 4 is a block diagram of various functional modules of an integrated biological sensing platform 402, in accordance with some embodiments. The integrated biological sensing platform 402 may include at least one integrated electrode, as discussed above. The integrated biological sensing platform 402 may include a processor 404. In further embodiments, the processor 404 may be implemented as one or more processors.

The processor 404 may be operatively connected to a computer readable storage module 406 (e.g., a memory and/or data store), a network connection module 408, a user interface module 410, a controller module 412, and a sensor module 414. In some embodiments, the computer readable storage module 406 may include integrated biological sensing platform logic that may configure the processor 404 to perform the various processes discussed herein. The computer readable storage 406 may also store data that may be utilized to perform the various processes discussed herein.

The network connection module 408 may facilitate a network connection of the integrated biological sensing platform 402 with various devices and/or components of the integrated biological sensing platform 402 that may communicate (e.g., send signals, messages, instructions, or data) within or external to the integrated biological sensing platform 402. In certain embodiments, the network connection module 408 may facilitate a physical connection, such as a line or a bus. In other embodiments, the network connection module 408 may facilitate a wireless connection, such as over a wireless local area network (WLAN) by using a transmitter, receiver, and/or transceiver. For example, the network connection module 408 may facilitate a wireless or wired connection with the processor 404 and the computer readable storage 406.

The integrated biological sensing platform 402 may also include the user interface module 410. The user interface module 410 may include any type of interface for input and/or output to an operator of the integrated biological sensing platform 402, including, but not limited to, a monitor, a laptop computer, a tablet, or a mobile device, etc.

The integrated biological sensing platform 402 may include a controller module 412. The controller module 412 may be configured to control various physical apparatuses that control aspects of the integrated biological sensing platform 402. For example, the controller module 412 may be configured to control movement or functionality for at least one of a switch to apply a voltage source at the electrowetting voltage (Vewod) to a gate of an integrated electrode or to disconnect the voltage source at the electrowetting voltage (Vewod) from the gate of the integrated electrode. Also, the controller module 412 may be configured to disconnect the voltage source from the gate of an integrated electrode to alternatively begin to sense for the voltage and/or current level across the drain region and source region (e.g., to have an integrated electrode operate as a bioFET). Accordingly, the controller may be controlled by the processor and may carry out the various aspects of the various processes discussed herein.

The sensor module 414 may represent a sensor configured to collect sensor data that may be utilized to characterize biomolecules or bio-entities. For example, the sensor module 414 may be active when the controller module 412 disconnects the voltage source from the gate of an integrated electrode so that the voltage and/or current level across the drain and source may be sensed. Stated another way, the sensor module may represent a sensing operation where the integrated electrode function operates as a bioFET (e.g., in a bioFET sensing mode).

Figure 5A:
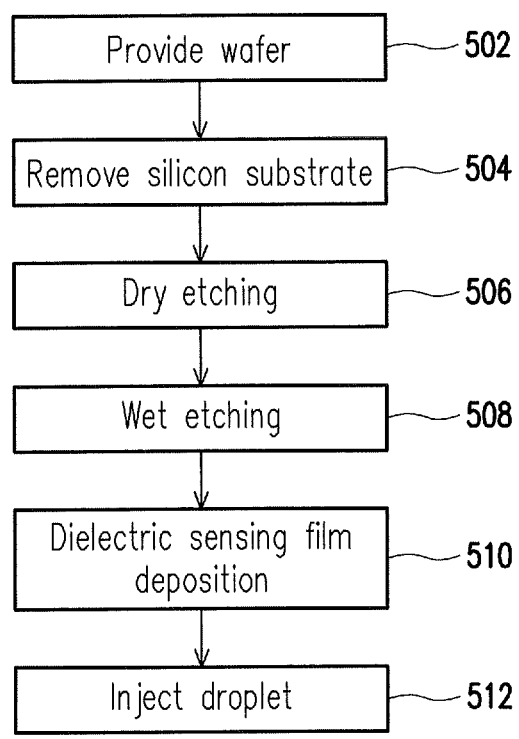
FIG. 5A is a flow chart of a bottom component integrated electrode assembly process, in accordance with some embodiments.

FIG. 5A is a flow chart of a bottom component integrated electrode assembly process 500, in accordance with some embodiments. It is noted that the process 500 is merely an example, and is not intended to limit the present disclosure. Accordingly, it is understood that additional operations may be provided before, during, and after the process 500 of FIG. 5A, certain operations may be omitted, certain operations may be performed concurrently with other operations, and that some other operations may only be briefly described herein.

In some embodiments, operations of the process 500 may be associated with the cross-sectional views of a semiconductor device at various fabrication stages as shown in FIGS. 5B, 5C, 5E, 5F, and 5G respectively, which will be discussed in further detail below.

At operation 502, a silicon on insulator (SOI) wafer may be provided. In certain embodiments, this SOI wafer may be flipped on a handling substrate. At operation 504, the silicon substrate may be removed so that the buried oxide (BOX) layer is exposed. At operation 506, dry etching may be performed in the BOX layer above the silicon (Si) or a silicon oxide (SiO2) layer. In certain embodiments, the Si or SiO2 layer may be referred to as a shallow trench isolation (STI) layer. At operation 508, wet etching may be performed in the BOX layer above the silicon (Si) or a silicon oxide (SiO2) layer. In certain embodiments, end point detection may be performed to optimize dry etching in order to skip this wet etching operation. At operation 510, the dielectric sensing film may be deposited. At operation 512, a liquid droplet may be injected and the integrated electrodes may operate in an electrowetting driving mode or in a bioFET sensing mode.

As mentioned above, FIG. 5B through FIG. 5G illustrate, in a cross-sectional views, the bottom component integrated electrode assembly process 500 at various stages of the process 500 of FIG. 5A. Also, FIGS. 5A through 5G are simplified for a better understanding of the concepts of the present disclosure. For example, although the figures illustrate an integrated electrode, it is understood the integrated electrode may comprise a number of other devices such as resistors, capacitors, inductors, fuses, etc., which are not shown in FIGS. 5B-5G, for purposes of clarity of illustration.

Figure 5B:
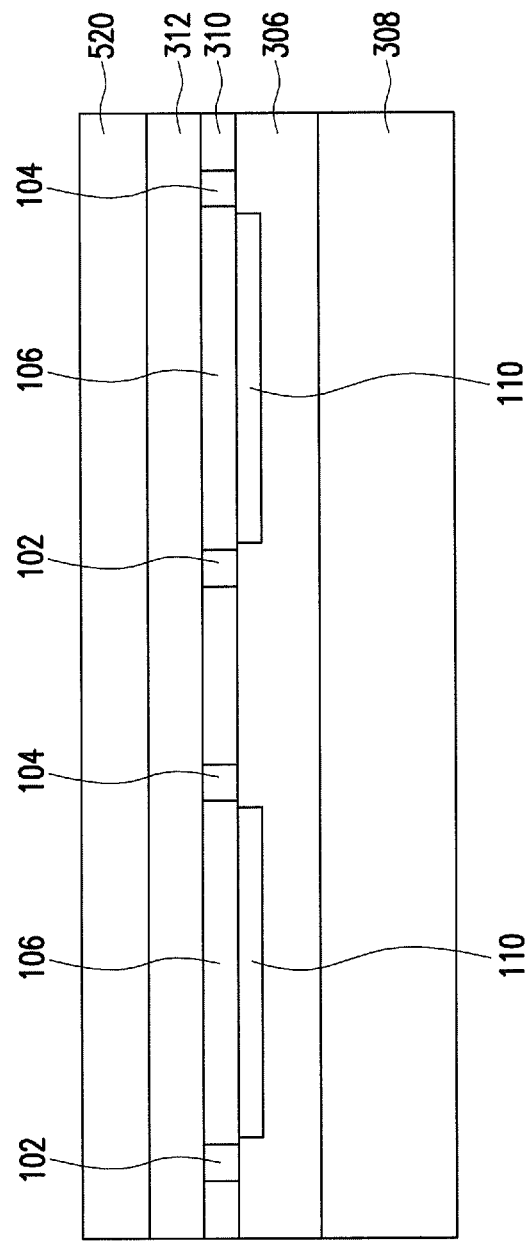
FIGS. 5B, 5C, 5D, 5E, 5F, and 5G illustrate cross-sectional views of an exemplary integrated electrode during various fabrication stages, made by the method of FIG. 5A, in accordance with some embodiments.

FIG. 5B illustrates a silicon on insulator (SOI) wafer 531 as a bottom component, in accordance with various embodiments. The SOI wafer may be flipped on a handling substrate, in accordance with various embodiments. FIG. 5B may illustrate features of operation 502 of FIG. 5A. The SOT wafer may include various layers, such as the inter dielectric (IDL) layer 306 above the handling substrate 308. The gate 110 may be formed in the IDL layer 306. The handling substrate may be made of silicon. The IDL layer 306 may be made of a metal, SiO2, or interlayer dielectrics. Then, the source region 102, channel region 106, and the drain region 104 may be formed in the silicon (Si) or a silicon oxide (SiO2) layer 310. The buried oxide (BOX) layer 312 may be formed over the Si or SiO2 layer 310. The BOX layer may be formed as an SiO2 isolation layer. Then, a silicon substrate layer 520 may abut the BOX layer.

Figure 5C:
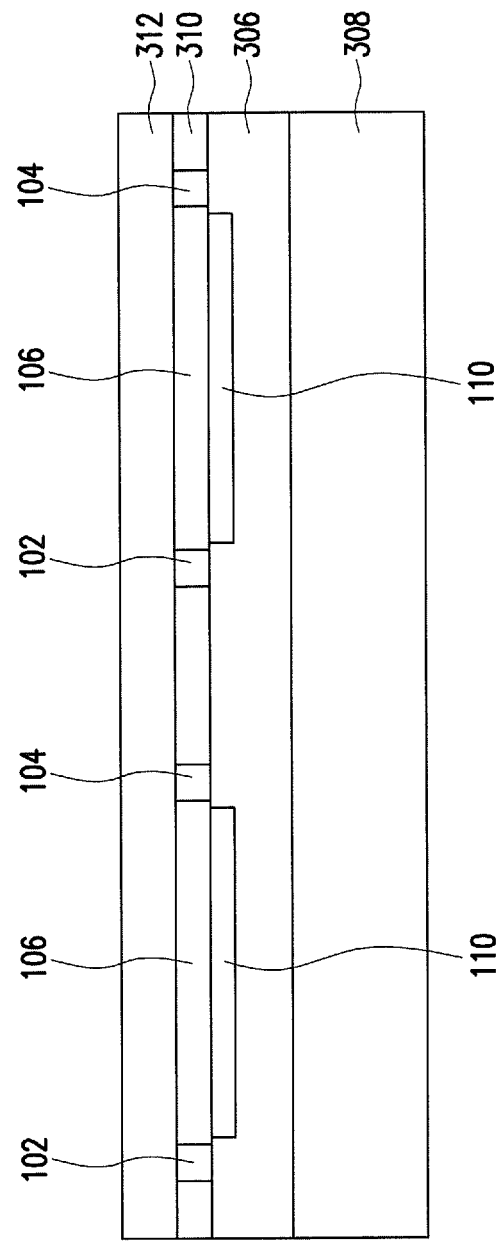

FIG. 5C illustrates a structure 533 with the silicon substrate removed so that the buried oxide (BOX) layer is exposed, in accordance with various embodiments. FIG. 5C may illustrate features of operation 504 of FIG. 5A. As illustrated, the silicon substrate layer that abuts the BOX layer may be removed (e.g., not present) in FIG. 5C.

Figure 5D:
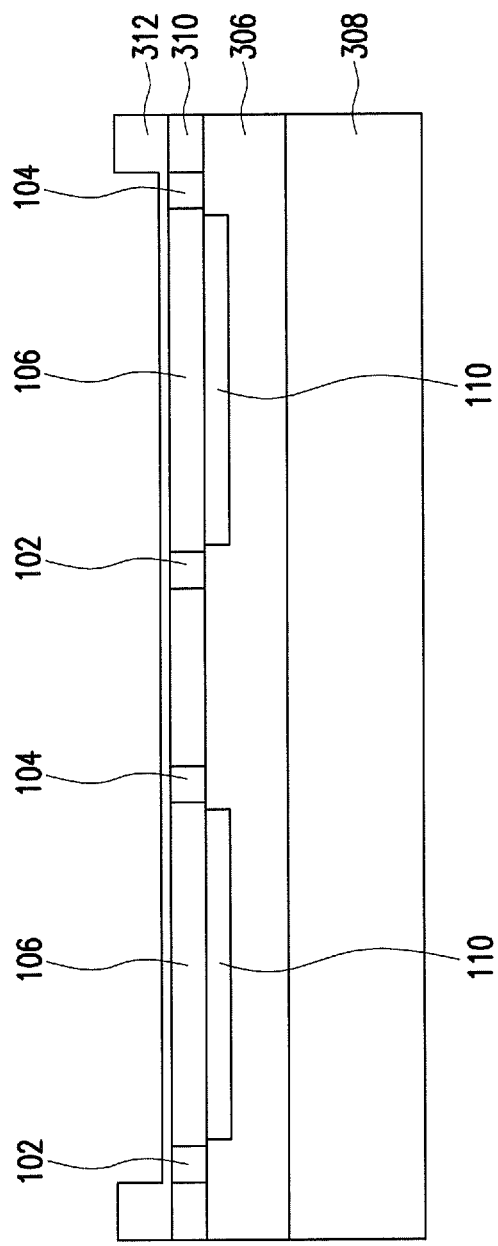

FIG. 5D illustrates a structure 535 that results from performance of dry etching in the BOX layer above the silicon (Si) or a silicon oxide (SiO2) layer, in accordance with various embodiments. FIG. 5D may illustrate features of operation 506 of FIG. 5A. As noted above, in certain embodiments, the Si or SiO2 layer may be referred to as a shallow trench isolation (STI) layer. Accordingly, the BOX layer 312 may be etched to form a channel or opening for droplet manipulation (e.g., movement).

Figure 5E:
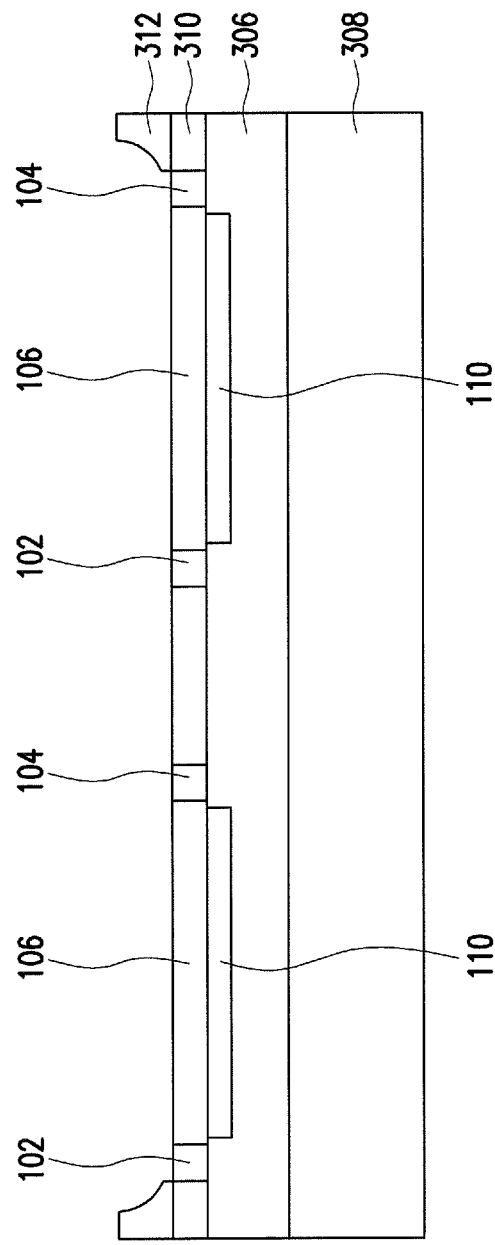

FIG. 5E illustrates a structure 537 that results from wet etching performed in the BOX layer above the silicon (Si) or a silicon oxide (SiO2) layer, in accordance with various embodiments. FIG. 5E may illustrate features of operation 508 of FIG. 5A. In certain embodiments, end point detection may be performed to optimize dry etching in order to skip this wet etching operation. Also, the depth of the opening formed by wet and/or dry etching may be from about 0.5 micrometers to about 1 micrometer so that droplets may be easily manipulated within the opening.

Figure 5F:
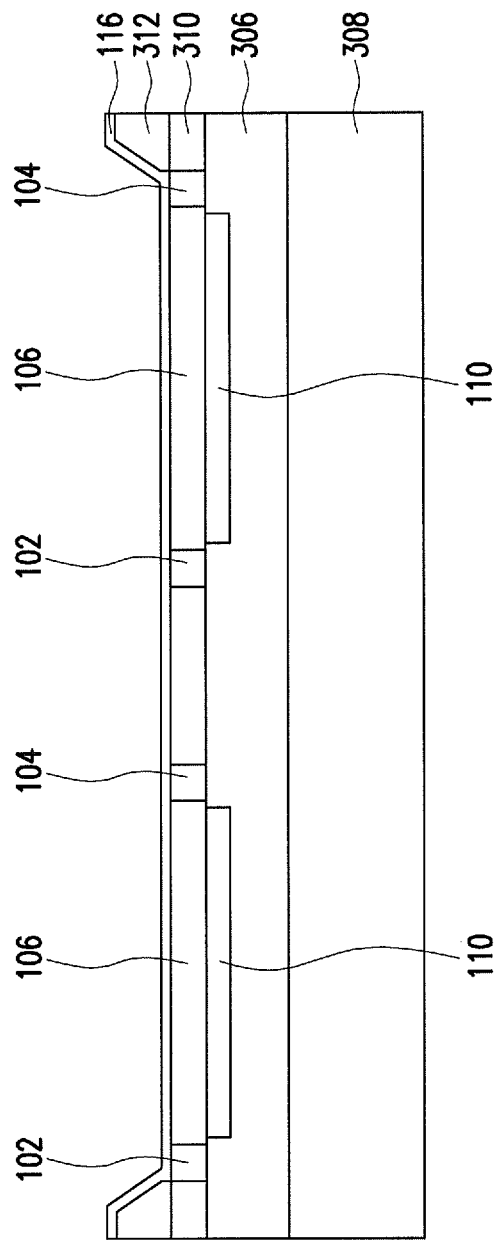

FIG. 5F illustrates a structure 539 that results from the deposition of the dielectric sensing film 116, in accordance with various embodiments. FIG. 5F may illustrate features of operation 510 of FIG. 5A. The dielectric sensing film 116 may be deposited using any suitable deposition process, such as chemical vapor deposition (CVD), physical vapor deposition (PVD), spin-on coating, and/or other suitable deposition technique. Accordingly, dielectric sensing film 116 may be disposed underneath a droplet and over the source region 102, channel region 106, and drain region 104.

Figure 5G:
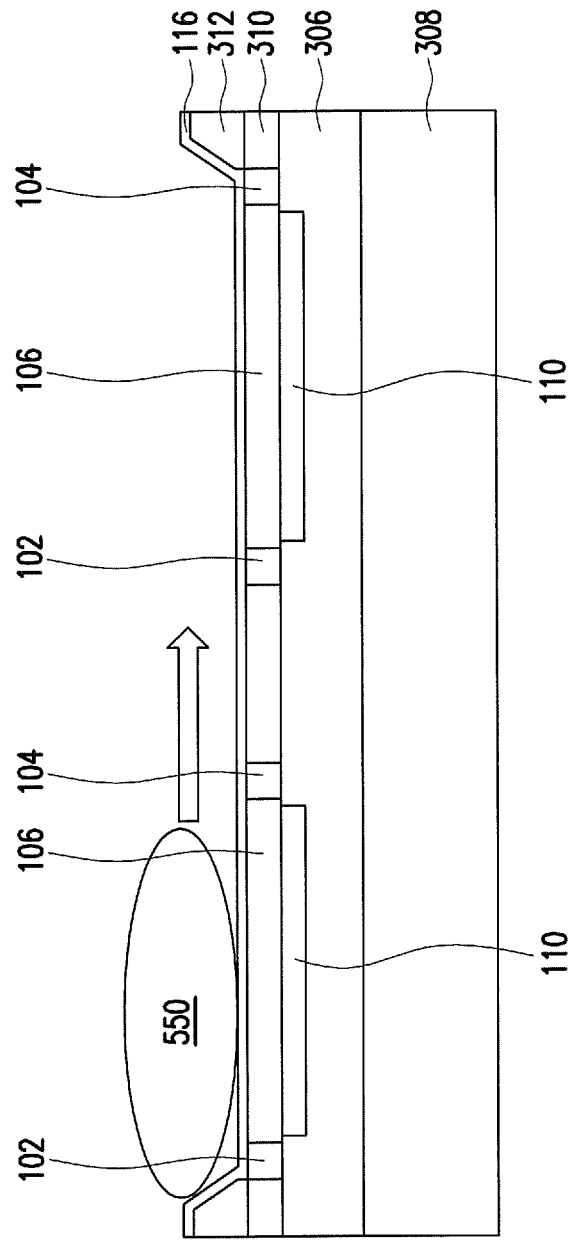

FIG. 5G illustrates a structure 541 with a liquid droplet 550 injected for the integrated electrodes to operate in an electrowetting driving mode or in a bioFET sensing mode, in accordance with various embodiments. FIG. 5G may illustrate features of operation 512 of FIG. 5A. The liquid droplet 550 may be manipulated when the integrated electrodes are in the electrowetting driving mode and sensor data may be collected based on the liquid droplet 550 when the integrated electrodes are in the bioFET sensing mode.

Figure 6A:
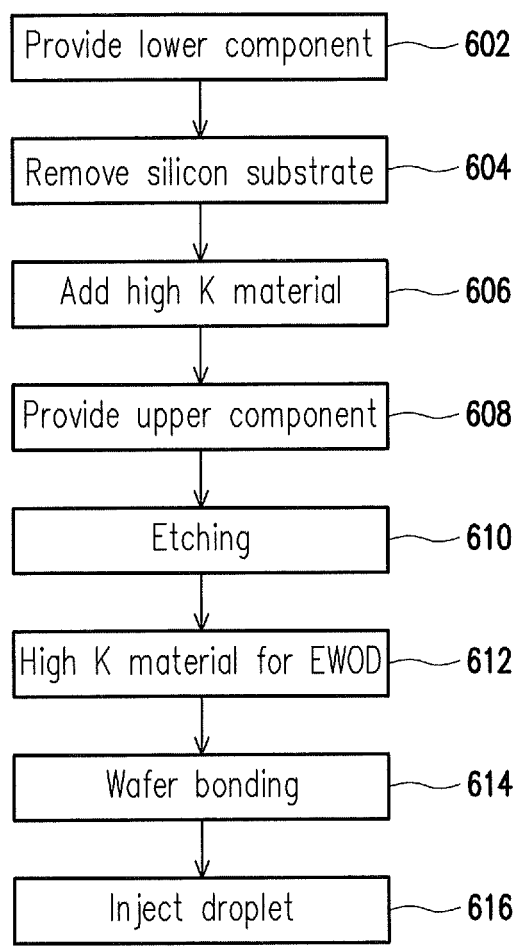
FIG. 6A is a flow chart of a top component etched integrated electrode assembly process, in accordance with some embodiments.

FIG. 6A is a flow chart of a top component etched integrated electrode assembly process 600, in accordance with some embodiments. It is noted that the process 600 is merely an example, and is not intended to limit the present disclosure. Accordingly, it is understood that additional operations may be provided before, during, and after the process 600 of FIG. 6A, certain operations may be omitted, certain operations may be performed concurrently with other operations, and that some other operations may only be briefly described herein.

In some embodiments, operations of the process 600 may be associated with the cross-sectional views of a semiconductor device at various fabrication stages as shown in FIGS. 6B, 6C, 6D, 6E, 6F, 6G, 6H, and 6I respectively, which will be discussed in further detail below.

At operation 602, a bottom component may be provided. The bottom component may include a silicon on insulator (SOI) wafer that may be flipped on a handling substrate. At operation 604, the silicon substrate may be removed so that the buried oxide (BOX) layer is exposed. At operation 606, the dielectric sensing film may be deposited on the BOX layer. In certain embodiments, the dielectric sensing film may include a high K material and/or exhibit hydrophobic qualities, as discussed above. At operation 608 a top component may be provided that includes an oxide, top electrode, and glass substrate. At operation 610, the oxide of the top component may be etched. At operation 612, a hydrophobic layer may be deposited over the top electrode and oxide. In certain embodiments, the hydrophobic layer may include a high K material. At operation 614, the top component may be flipped and bonded to the bottom component. In certain embodiments, this bonding may be performed as a HfO2 to HfO2 fusion bonding. At operation 616, a droplet may be injected and the integrated electrodes may operate in an electrowetting driving mode or in a bioFET sensing mode.

As mentioned above, FIG. 6B through FIG. 6I illustrate, in cross-sectional views, the top component etched integrated electrode assembly process 600 at various stages of the process 600 of FIG. 6A. Also, FIGS. 6A through 6G are simplified for a better understanding of the concepts of the present disclosure. For example, although the figures illustrate an integrated electrode, it is understood the integrated electrode may comprise a number of other devices such as resistors, capacitors, inductors, fuses, etc., which are not shown in FIGS. 6B-6G, for purposes of clarity of illustration.

Figure 6B:
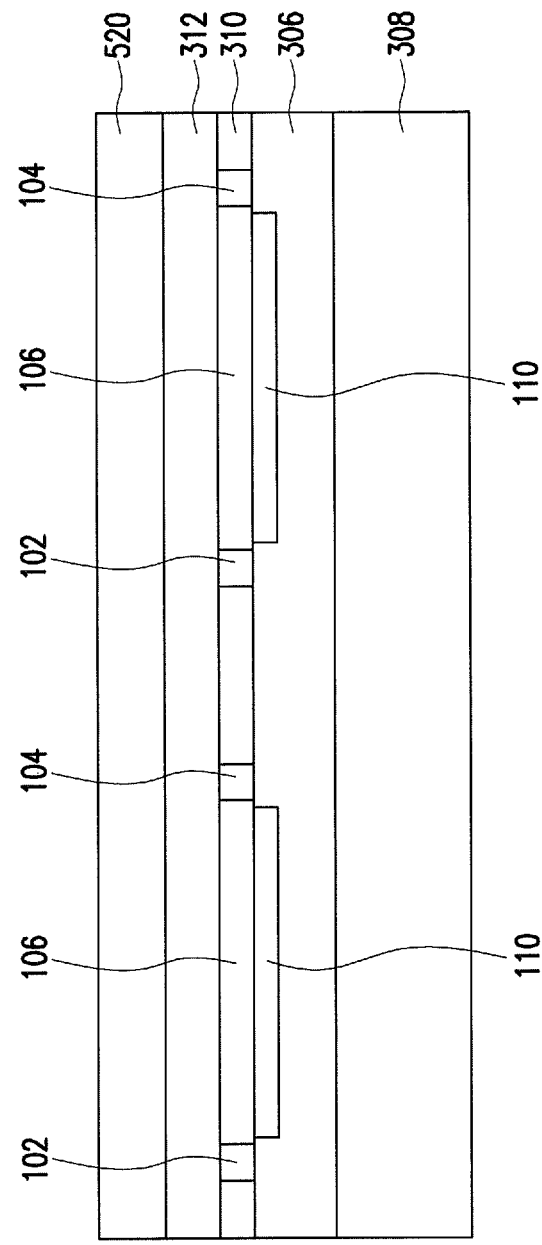

FIG. 6B illustrates a silicon on insulator (SOI) wafer 621 as a bottom component, in accordance with various embodiments. FIG. 6B may illustrate features of operation 602 of FIG. 6A. The SOI wafer may include various layers, such as the inter dielectric (IDL) layer 306 above the handling substrate 308. The gate 110 may be formed in the IDL layer 306. The handling substrate may be made of silicon. The IDL layer 306 may be made of a metal, SiO2, or interlayer dielectrics. Then, the source region 102, channel region 106, and the drain region 104 may be formed in the silicon (Si) or a silicon oxide (SiO2) layer 310. The buried oxide (BOX) layer 312 may be formed over the Si or SiO2 layer 310. The BOX layer may be formed as an SiO2 isolation layer. Then, a silicon substrate layer 520 may abut the BOX layer.

Figure 6C:
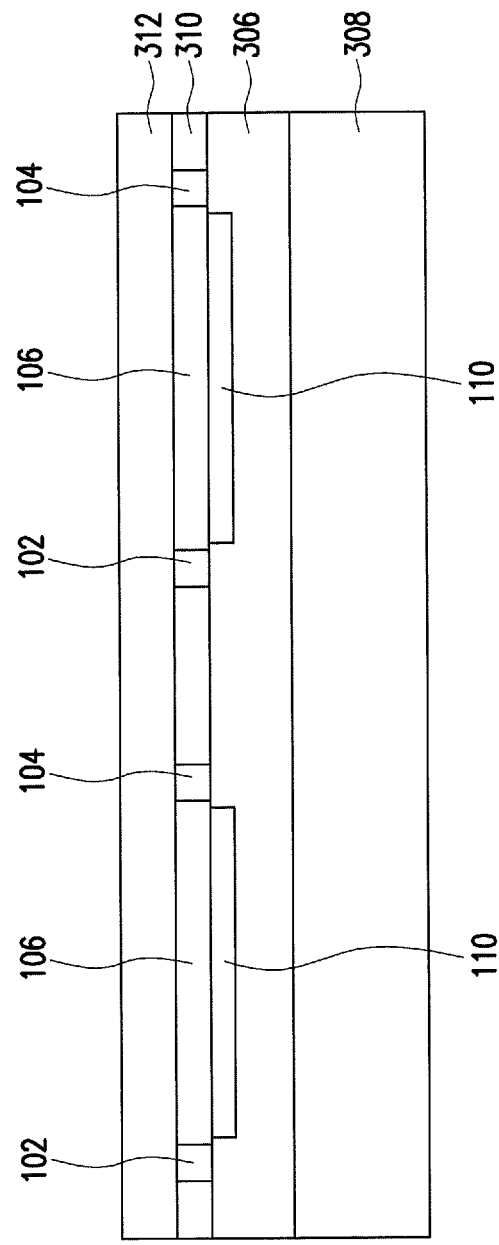

FIG. 6C illustrates a structure 623 resulting from removing the silicon substrate so that the buried oxide (BOX) layer is exposed, in accordance with various embodiments. FIG. 6C may illustrate features of operation 604 of FIG. 6A. As illustrated, the silicon substrate layer that abuts the BOX layer may be removed (e.g., not present) in FIG. 6C.

Figure 6D:
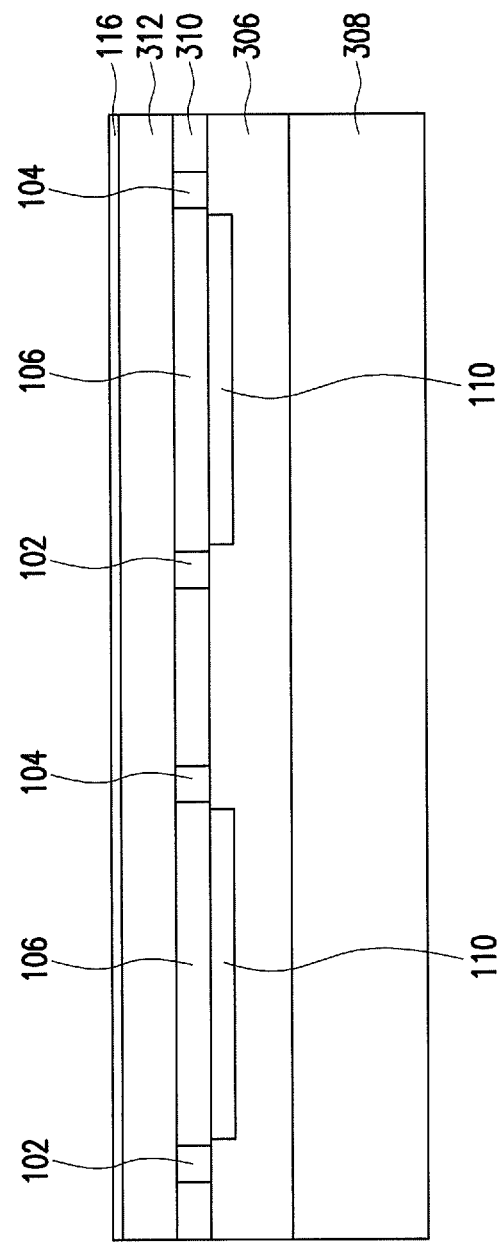

FIG. 6D illustrates a structure 625 resulting from depositing the dielectric sensing film 116 on the BOX layer, in accordance with various embodiments. FIG. 6D may illustrate features of operation 606 of FIG. 6A. In certain embodiments, the dielectric sensing film may include a high K material and/or exhibit hydrophobic qualities, as discussed above. The dielectric sensing film 116 may be deposited using any suitable deposition process, such as chemical vapor deposition (CVD), physical vapor deposition (PVD), spin-on coating, and/or other suitable deposition technique.

Figure 6E:
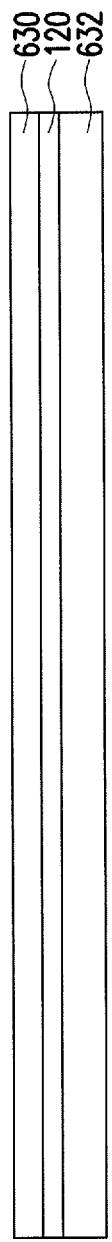

FIG. 6E illustrates a top component 627, in accordance with various embodiments. The top component may include an oxide 630, top electrode 120, and glass substrate 632. FIG. 6E may illustrate features of operation 608 of FIG. 6A.

Figure 6F:
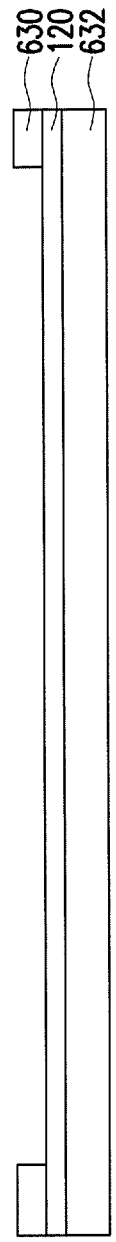

FIG. 6F illustrates a structure 635 resulting from etching of the oxide 630 of the top component, in accordance with various embodiments. FIG. 6F may illustrate features of operation 610 of FIG. 6A.

Figure 6G:
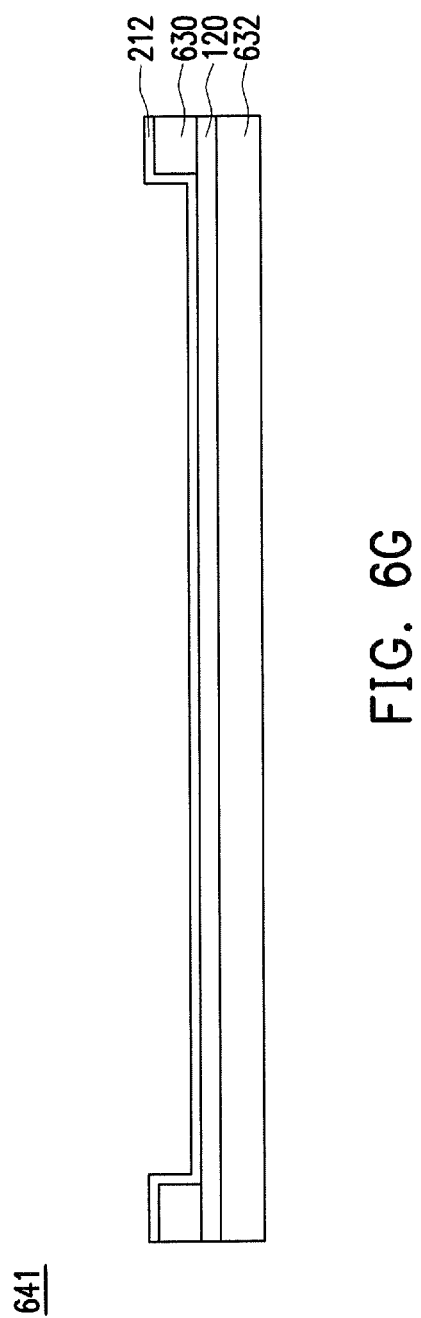

FIG. 6G illustrates a structure 641 resulting from deposition of the hydrophobic layer 212 over the top electrode 120 and oxide 630, in accordance with various embodiments. FIG. 6G may illustrate features of operation 612 of FIG. 6A. In certain embodiments, the hydrophobic layer 212 may include a high K material.

Figure 6H:
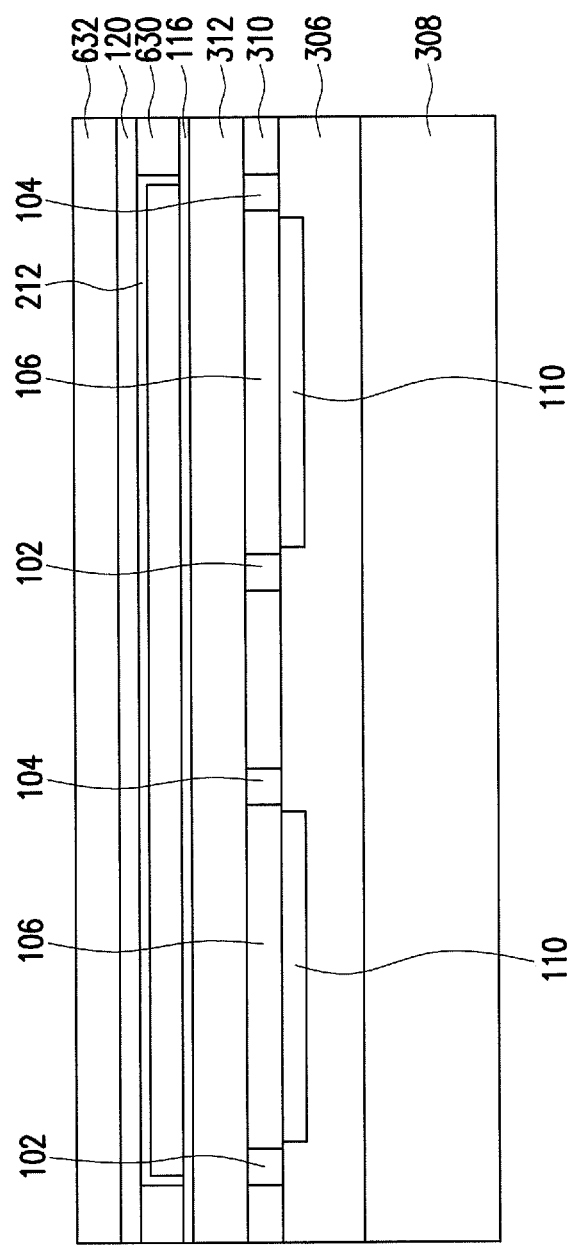
Figure 61:
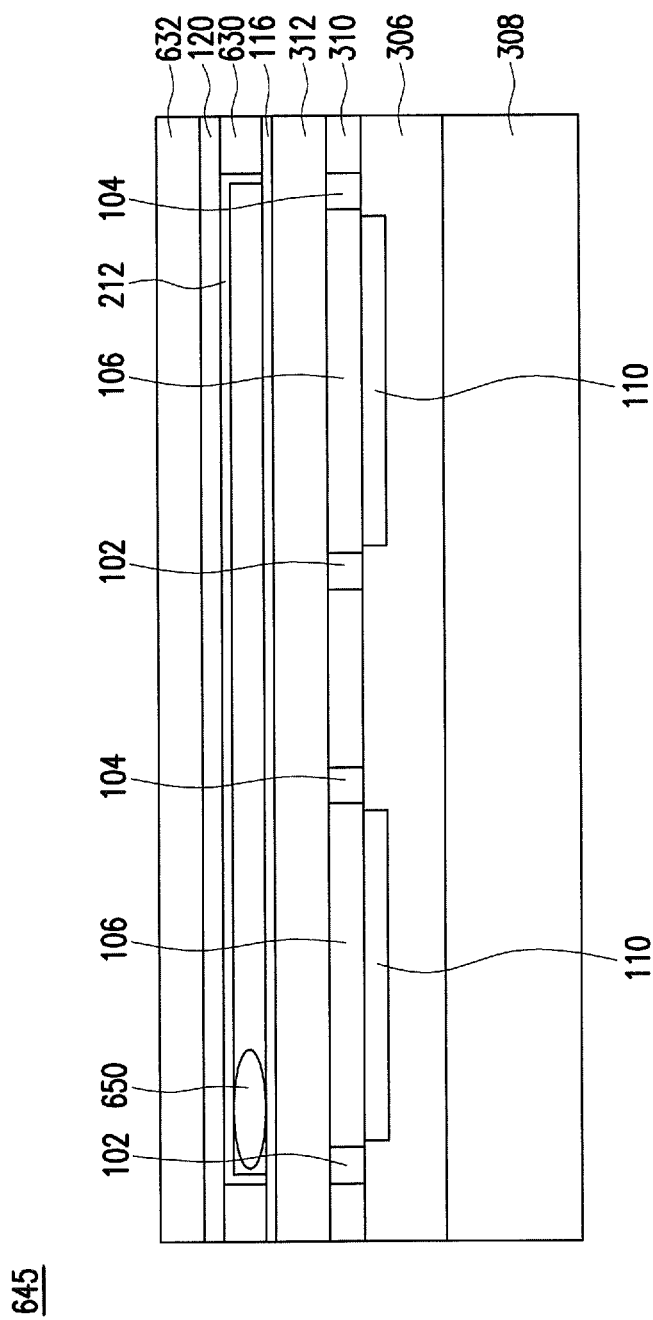

FIG. 6H illustrates a structure 643 resulting from having the processed top component flipped and bonded to the processed bottom component, in accordance with various embodiments. FIG. 6H may illustrate features of operation 614 of FIG. 6A. In certain embodiments, this bonding may be performed as a HfO2 to HfO2 fusion bonding.

FIG. 6I illustrates a structure 645 with an injected liquid droplet 650, in accordance with various embodiments. FIG. 6I may illustrate features of operation 616 of FIG. 6A. The liquid droplet 650 may be manipulated when the integrated electrodes are in the electrowetting driving mode and sensor data may be collected based on the liquid droplet 650 when the integrated electrodes are in the bioFET sensing mode.

Figure 7A:
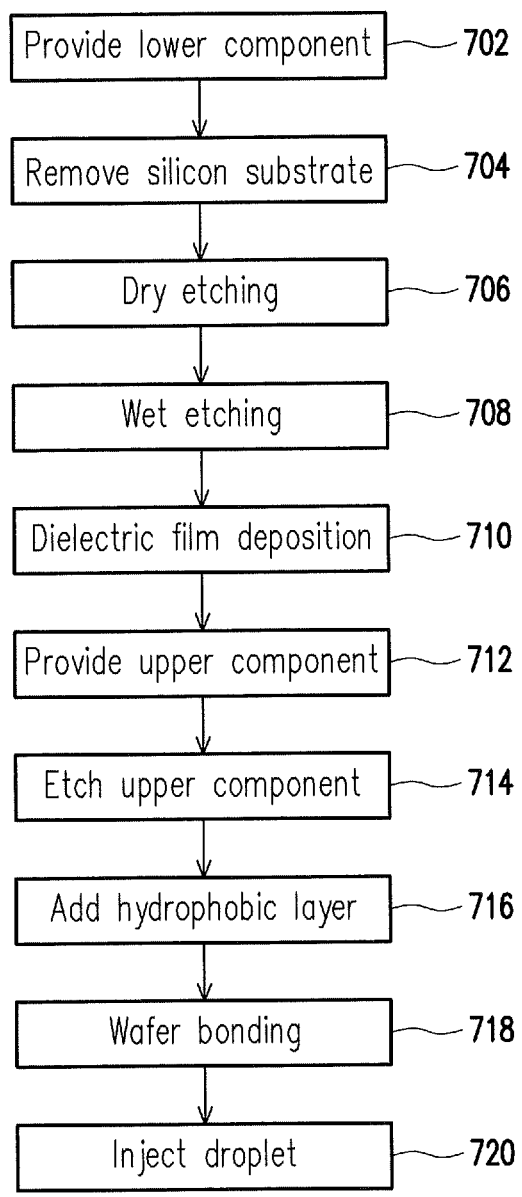
FIG. 7A is a flow chart of a bottom component etched integrated electrode assembly process, in accordance with some embodiments.

FIG. 7A is a flow chart of a bottom component etched integrated electrode assembly process 700, in accordance with some embodiments. It is noted that the process 700 is merely an example, and is not intended to limit the present disclosure. Accordingly, it is understood that additional operations may be provided before, during, and after the process 700 of FIG. 7A, certain operations may be omitted, certain operations may be performed concurrently with other operations, and that some other operations may only be briefly described herein.

In some embodiments, operations of the process 700 may be associated with the cross-sectional views of a semiconductor device at various fabrication stages as shown in FIGS. 7B, 7C, 7D, 7E, 7F, 7G, 7H, 7I, 7J, and 7K respectively, which will be discussed in further detail below.

At operation 702, a silicon on insulator (SOI) wafer may be provided. In certain embodiments, this SOI wafer may be flipped on a handling substrate. At operation 704, the silicon substrate may be removed so that the buried oxide (BOX) layer is exposed. At operation 706, dry etching may be performed in the BOX layer above the silicon (Si) or a silicon oxide (SiO2) layer. In certain embodiments, the Si or SiO2 layer may be referred to as a shallow trench isolation (STI) layer. At operation 708, wet etching may be performed in the BOX layer above the silicon (Si) or a silicon oxide (SiO2) layer. In certain embodiments, end point detection may be performed to optimize dry etching in order to skip this wet etching operation. At operation 710, the dielectric sensing film may be deposited. At operation 712 a top component may be provided that includes an oxide, top electrode, and glass substrate. At operation 714, the oxide of the top component may be etched to removal. In certain embodiments, operation 712 may include a top component without an oxide and thus operation 714 may be skipped. At operation 716, a hydrophobic layer may be deposited over the top electrode. In certain embodiments, the hydrophobic layer may include a high K material. At operation 718, the top component may be flipped and bonded to the bottom component. In certain embodiments, this bonding may be performed as a HfO2 to HfO2 fusion bonding. At operation 720, a liquid droplet may be injected and the integrated electrodes may operate in an electrowetting driving mode or in a bioFET sensing mode.

As mentioned above, FIG. 7B through FIG. 7K illustrate, in cross-sectional views, the bottom component etched integrated electrode assembly process 700 at various stages of the process 700 of FIG. 7A. Also, FIGS. 7A through 7K are simplified for a better understanding of the concepts of the present disclosure. For example, although the figures illustrate an integrated electrode, it is understood the integrated electrode may comprise a number of other devices such as resistors, capacitors, inductors, fuses, etc., which are not shown in FIGS. 7B-7G, for purposes of clarity of illustration.

Figure 7B:
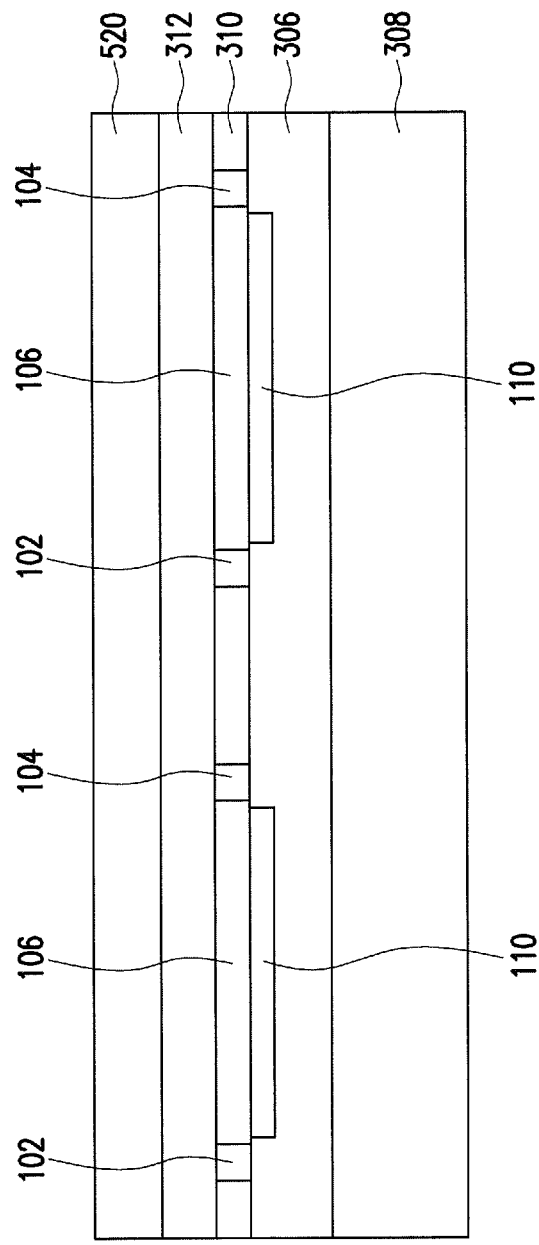

FIG. 7B illustrates a silicon on insulator (SOI) wafer 731 as a bottom component, in accordance with various embodiments. The SOI wafer may be is flipped on a handling substrate, in accordance with various embodiments. FIG. 7B may illustrate features of operation 702 of FIG. 7A. The SOI wafer may include various layers, such as the inter dielectric (IDL) layer 306 above the handling substrate 308. The gate 110 may be formed in the IDL layer 306. The handling substrate may be made of silicon. The IDL layer 306 may be made of a metal, SiO2, or interlayer dielectrics. Then, the source region 102, channel region 106, and the drain region 104 may be formed in the silicon (Si) or a silicon oxide (SiO2) layer 310. The buried oxide (BOX) layer 312 may be formed over the Si or SiO2 layer 310. The BOX layer 312 may be formed as an SiO2 isolation layer. Then, a silicon substrate layer 520 may abut the BOX layer 312.

Figure 7C:
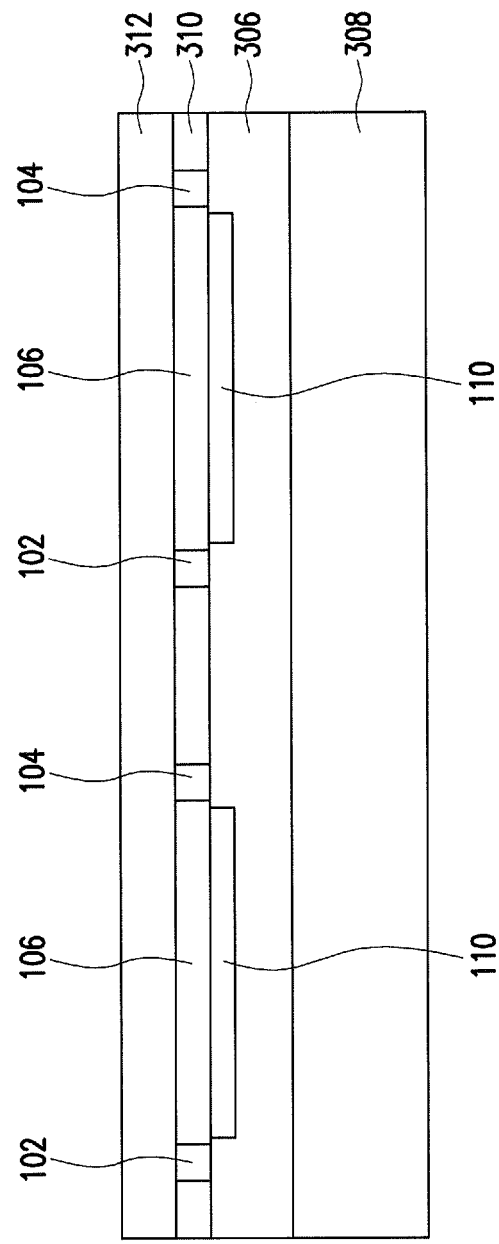

FIG. 7C illustrates a structure 733 resulting from removal of the silicon substrate so that the buried oxide (BOX) layer is exposed, in accordance with various embodiments. FIG. 7C may illustrate features of operation 704 of FIG. 7A. As illustrated, the silicon substrate layer that abuts the BOX layer may be removed (e.g., not present) in FIG. 7C.

Figure 7D:
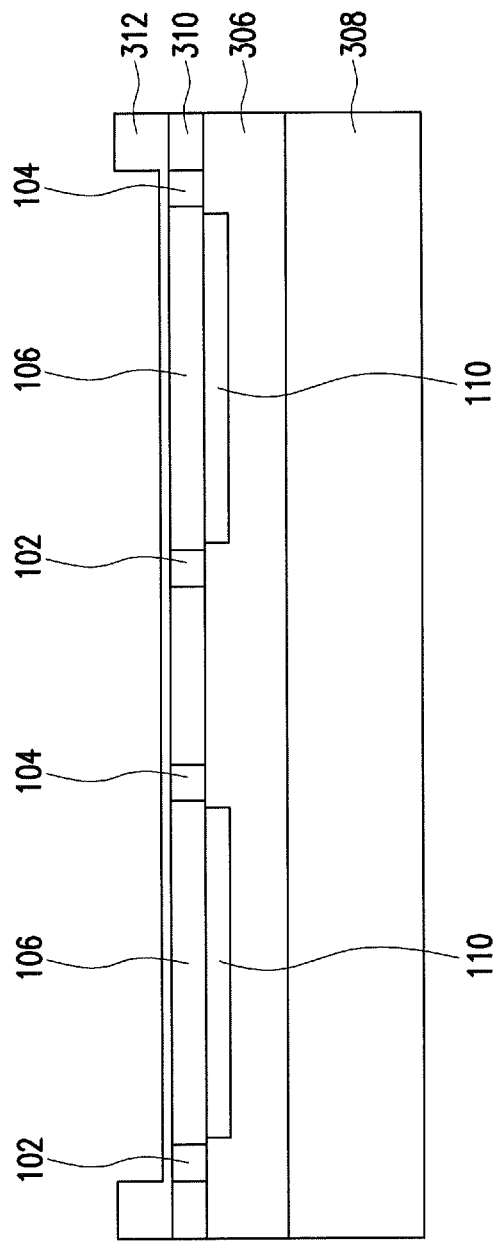

FIG. 7D illustrates a structure 735 resulting from dry etching performed in the BOX layer above the silicon (Si) or a silicon oxide (SiO2) layer, in accordance with various embodiments. FIG. 7D may illustrate features of operation 706 of FIG. 7A. As noted above, in certain embodiments, the Si or SiO2 layer may be referred to as a shallow trench isolation (STI) layer. Accordingly, the BOX layer 312 may be etched to form a channel or opening for droplet manipulation (e.g., movement).

Figure 7E:
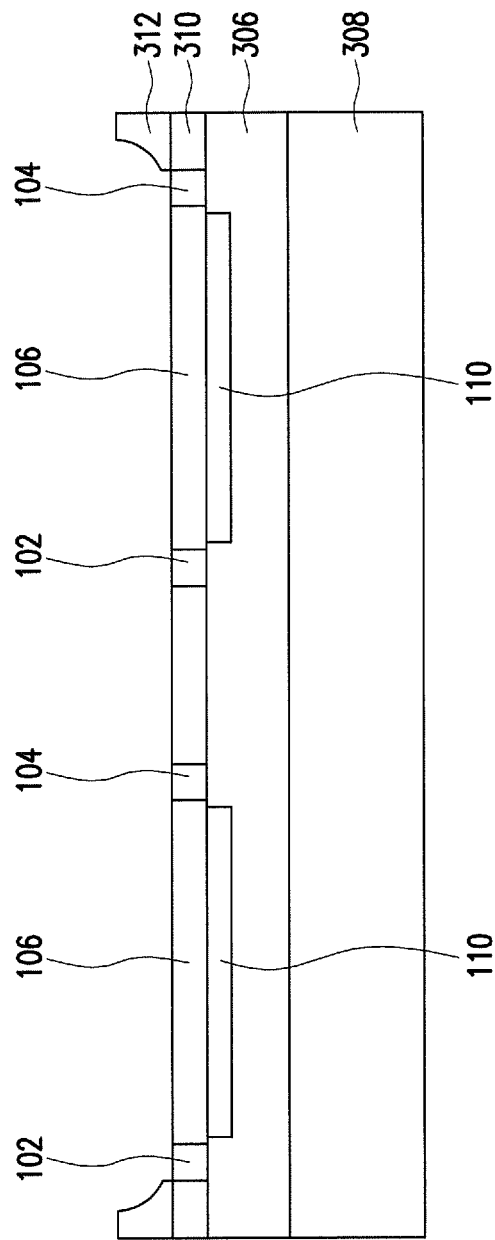

FIG. 7E illustrates a structure 737 resulting from wet etching performed in the BOX layer above the silicon (Si) or a silicon oxide (SiO2) layer, in accordance with various embodiments. FIG. 7E may illustrate features of operation 708 of FIG. 7A. In certain embodiments, end point detection may be performed to optimize dry etching in order to skip this wet etching operation. Also, the depth of the opening formed by wet and/or dry etching may be from about 0.5 micrometers to about 1 micrometer so that droplets may be easily manipulated within the opening.

Figure 7F:
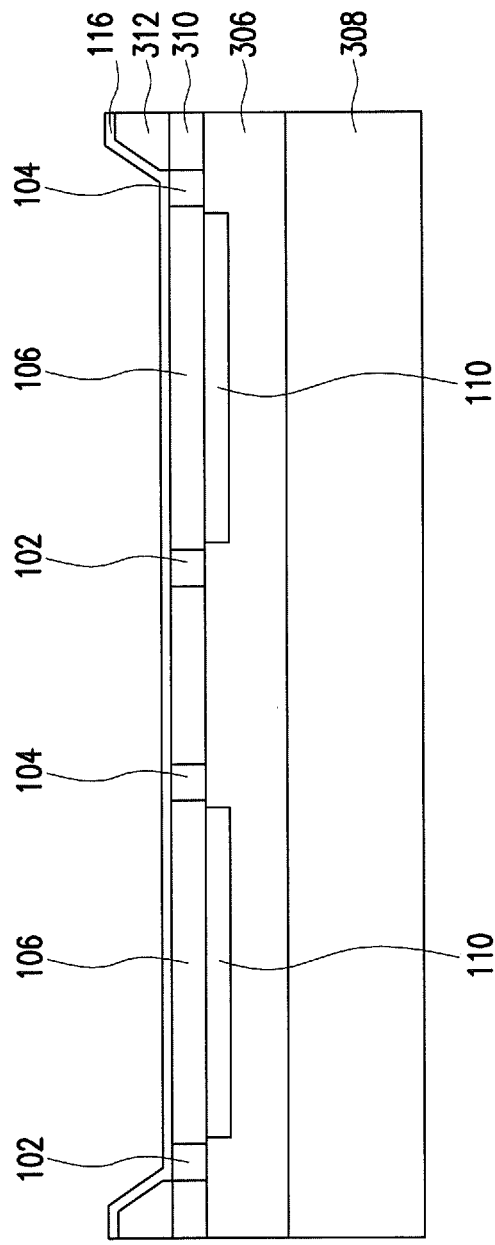

FIG. 7F illustrates a structure 739 resulting from depositing the dielectric sensing film 116, in accordance with various embodiments. FIG. 7F may illustrate features of operation 710 of FIG. 7A. The dielectric sensing film 116 may be deposited using any suitable deposition process, such as chemical vapor deposition (CVD), physical vapor deposition (PVD), spin-on coating, and/or other suitable deposition technique. Accordingly, dielectric sensing film 116 may be disposed underneath a droplet and over the source region 102, channel region 106, and drain region 104.

Figure 7G:
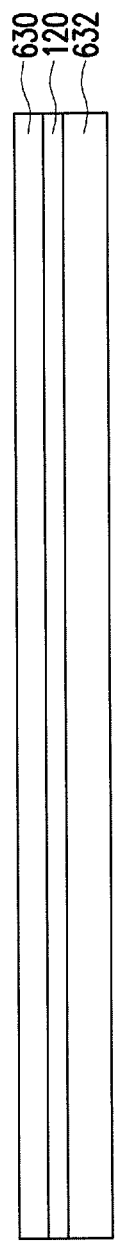

FIG. 7G illustrates a top component 741, in accordance with various embodiments. The top component may include an oxide 630, top electrode 120, and glass substrate 632. FIG. 7G may illustrate features of operation 712 of FIG. 7A.

Figure 7H:
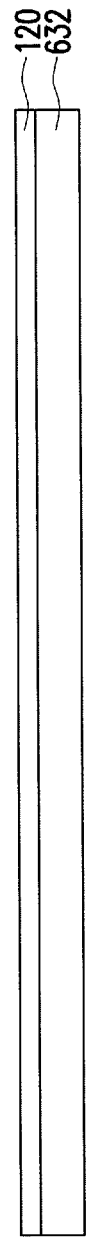
Figure 71:
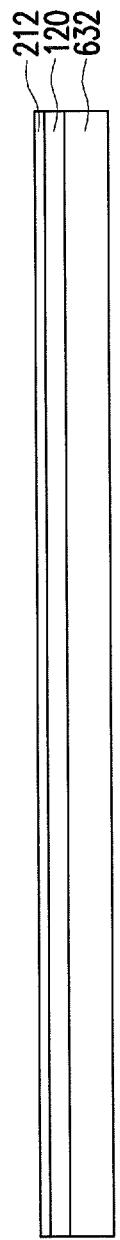

FIG. 7H illustrates a structure 743 resulting from having the oxide 630 of the top component etched, in accordance with various embodiments. FIG. 7H may illustrate features of operation 714 of FIG. 7A. The oxide may be etched to removal. In certain embodiments, the top component may not include an oxide and thus FIG. 7H may illustrate the top component (e.g., top component without an oxide).

FIG. 7I illustrates a structure 745 resulting from having the hydrophobic layer 212 deposited over the top electrode 120, in accordance with various embodiments. FIG. 7I may illustrate features of operation 716 of FIG. 7A. In certain embodiments, the hydrophobic layer 212 may include a high K material.

Figure 7J:
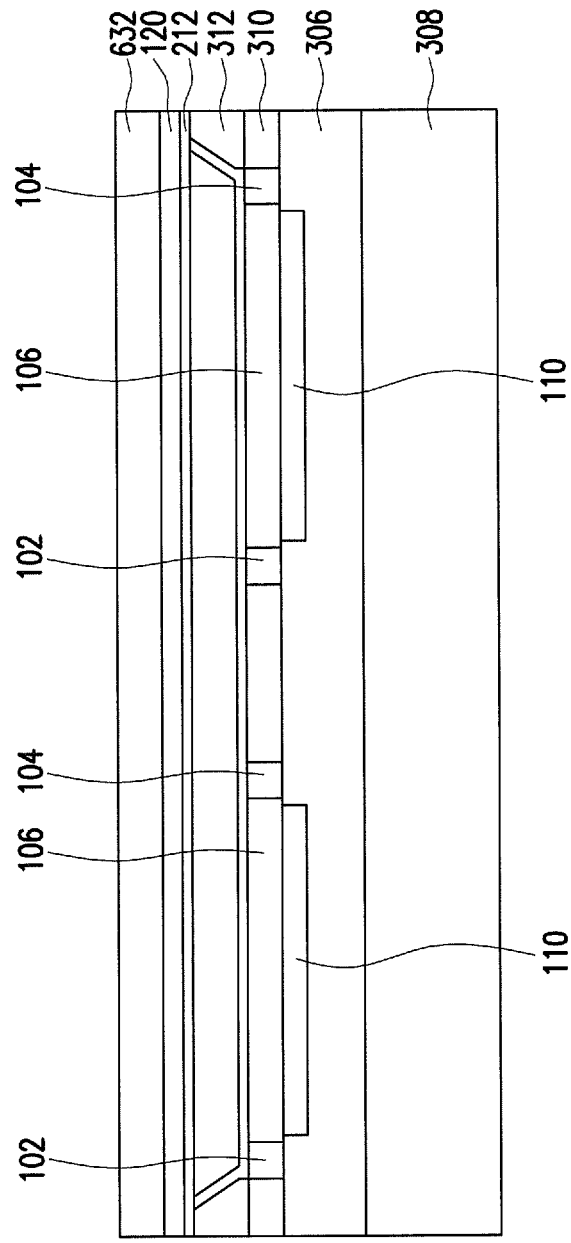

FIG. 7J illustrates a structure 747 resulting from having the top component flipped and bonded to the bottom component, in accordance with various embodiments. FIG. 7J may illustrate features of operation 618 of FIG. 7A. In certain embodiments, this bonding may be performed as a HfO2 to HfO2 fusion bonding.

Figure 7K:
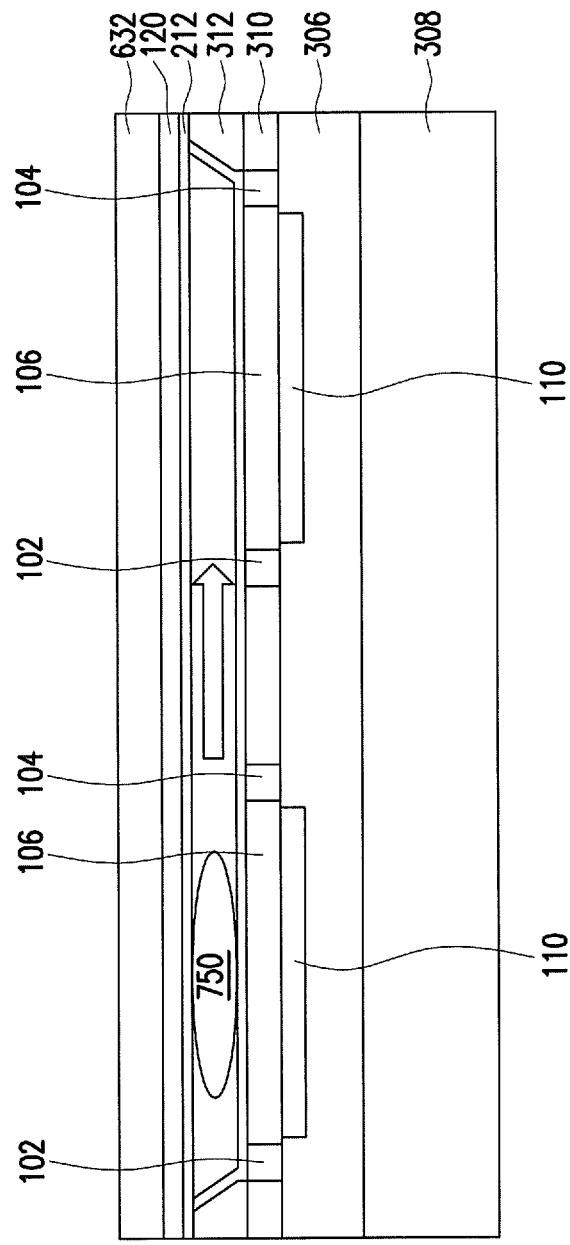

FIG. 7K illustrates a structure 749 with an injected liquid droplet 750, in accordance with various embodiments. FIG. 7K may illustrate features of operation 720 of FIG. 7A. The liquid droplet 750 may be manipulated when the integrated electrodes are in the electrowetting driving mode and sensor data may be collected based on the liquid droplet 750 when the integrated electrodes are in the bioFET sensing mode.

Figure 8A:
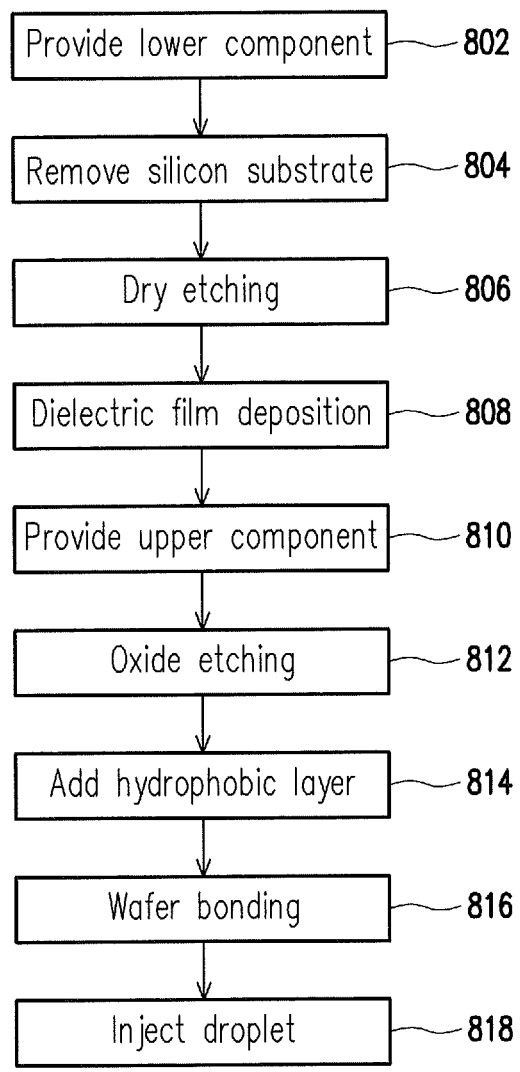
FIG. 8A is a flow chart of a dual component etched integrated electrode assembly process, in accordance with some embodiments.

FIG. 8A is a flow chart of a dual component etched integrated electrode assembly process 800, in accordance with some embodiments. It is noted that the process 800 is merely an example, and is not intended to limit the present disclosure. Accordingly, it is understood that additional operations may be provided before, during, and after the process 800 of FIG. 8A, certain operations may be omitted, certain operations may be performed concurrently with other operations, and that some other operations may only be briefly described herein.

In some embodiments, operations of the process 800 may be associated with the cross-sectional views of a semiconductor device at various fabrication stages as shown in FIGS. 8B, 8C, 8D, 8E, 8F, 8G, 8H, 8I, and 8J respectively, which will be discussed in further detail below.

At operation 802, a silicon on insulator (SOI) wafer may be provided. In certain embodiments, this SOI wafer may be flipped on a handling substrate. At operation 804, the silicon substrate may be removed so that the buried oxide (BOX) layer is exposed. At operation 806, dry etching may be performed in the BOX layer above the silicon (Si) or a silicon oxide (SiO2) layer. In certain embodiments, the Si or SiO2 layer may be referred to as a shallow trench isolation (STI) layer. In certain embodiments, end point detection may be performed to optimize dry etching in order to skip a wet etching operation. However, in other embodiments a wet etching operation may follow the dry etching operation 806. At operation 808, the dielectric sensing film may be deposited. At operation 810 a top component may be provided that includes an oxide, top electrode, and glass substrate. At operation 812, the oxide of the top component may be etched. In certain embodiments, operation 812 may include a top component without an oxide and thus operation 814 may be skipped. At operation 814, a hydrophobic layer may be deposited over the top electrode. In certain embodiments, the hydrophobic layer may include a high K material. At operation 816, the top component may be flipped and bonded to the bottom component. In certain embodiments, this bonding may be performed as a HfO2 to HfO2 fusion bonding. At operation 818, a liquid droplet may be injected and the integrated electrodes may operate in an electrowetting driving mode or in a bioFET sensing mode.

As mentioned above, FIG. 8B through FIG. 8K illustrate, in cross-sectional views, the dual component etched integrated electrode assembly process 800 at various stages of the process 800 of FIG. 8A. Also, FIGS. 8A through 8J are simplified for a better understanding of the concepts of the present disclosure. For example, although the figures illustrate an integrated electrode, it is understood the integrated electrode may comprise a number of other devices such as resistors, capacitors, inductors, fuses, etc., which are not shown in FIGS. 8B-8G, for purposes of clarity of illustration.

Figure 8B:
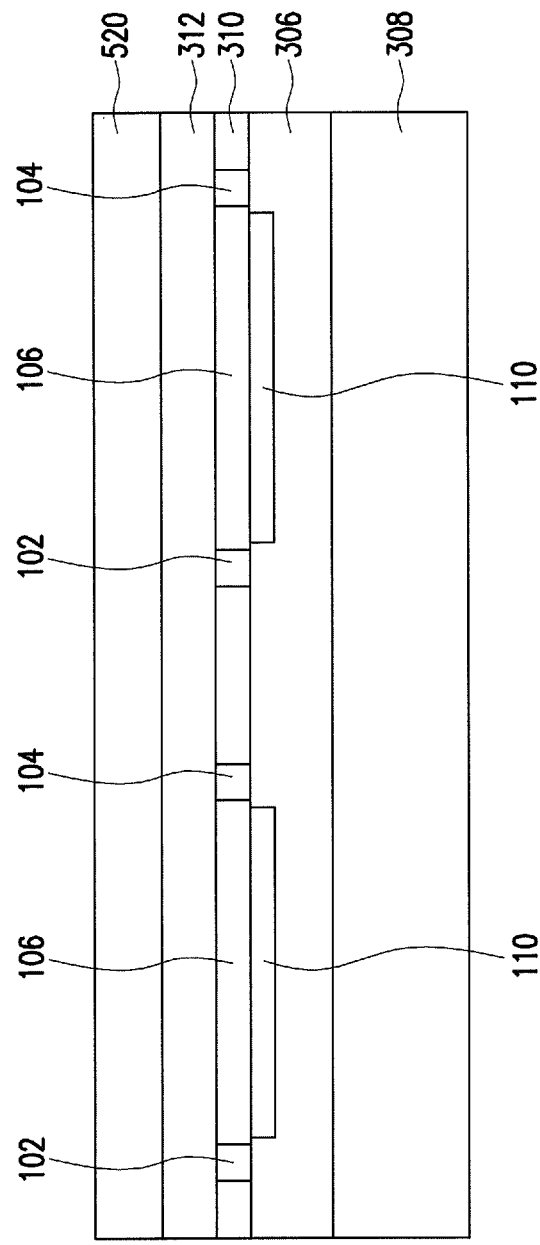
FIGS. 8B, 8C, 8D, 8E, 8F, 8G, 8H, 8I, and 8J illustrate cross-sectional views of an exemplary integrated electrode during various fabrication stages, made by the method of FIG. 6A, in accordance with some embodiments.

FIG. 8B illustrates a silicon on insulator (SOI) wafer 831 as a bottom component, in accordance with various embodiments. The SOI wafer may be is flipped on a handling substrate, in accordance with various embodiments. FIG. 8B may illustrate features of operation 802 of FIG. 8A. The SOI wafer may include various layers, such as the inter dielectric (IDL) layer 306 above the handling substrate 308. The gate 110 may be formed in the IDL layer 306. The handling substrate may be made of silicon. The IDL layer 306 may be made of a metal, SiO2, or interlayer dielectrics. Then, the source region 102, channel region 106, and the drain region 104 may be formed in the silicon (Si) or a silicon oxide (SiO2) layer 310. The buried oxide (BOX) layer 312 may be formed over the Si or SiO2 layer 310. The BOX layer may be formed as an SiO2 isolation layer. Then, a silicon substrate layer 820 may abut the BOX layer.

Figure 8C:
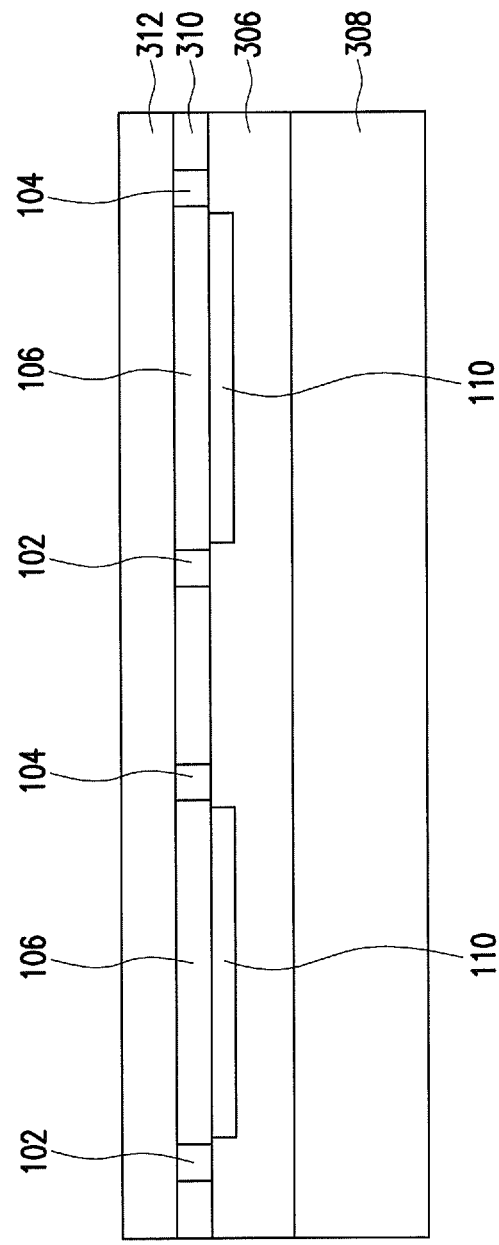

FIG. 8C illustrates a structure 833 resulting from removal of the silicon substrate so that the buried oxide (BOX) layer is exposed, in accordance with various embodiments. FIG. 8C may illustrate features of operation 804 of FIG. 8A. As illustrated, the silicon substrate layer that abuts the BOX layer may be removed (e.g., not be present) in FIG. 8C.

Figure 8D:
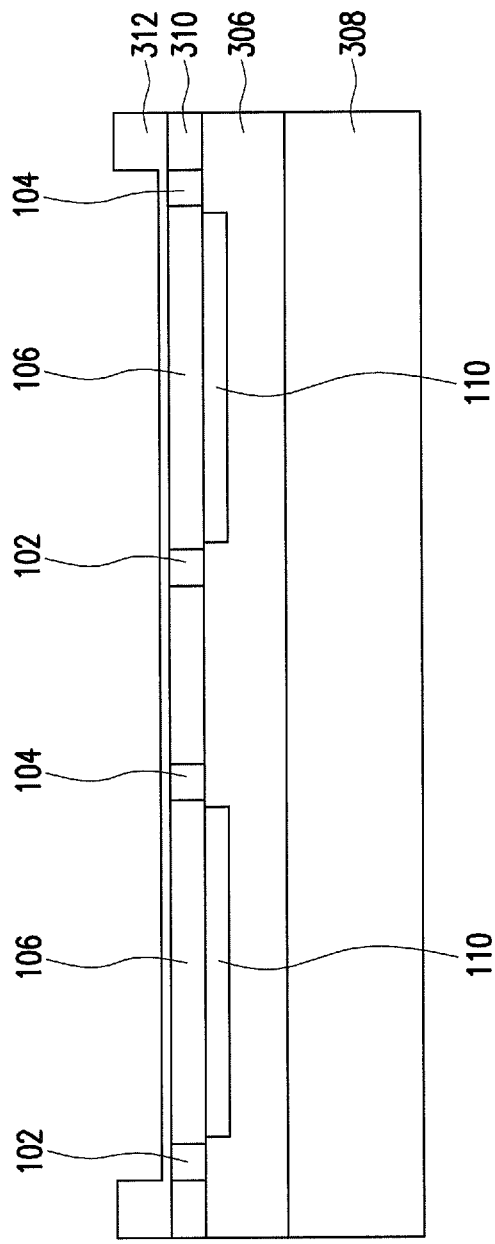

FIG. 8D illustrates a structure 835 resulting from dry etching performed in the BOX layer above the silicon (Si) or a silicon oxide (SiO2) layer, in accordance with various embodiments. FIG. 8D may illustrate features of operation 806 of FIG. 8A. As noted above, in certain embodiments, the Si or SiO2 layer may be referred to as a shallow trench isolation (STI) layer. Accordingly, the BOX layer 312 may be etched to form a channel or opening for droplet manipulation (e.g., movement). Also, the depth of the opening formed by dry etching may be from about 0.5 micrometers to about 1 micrometer so that droplets may be easily manipulated within the opening.

Figure 8E:
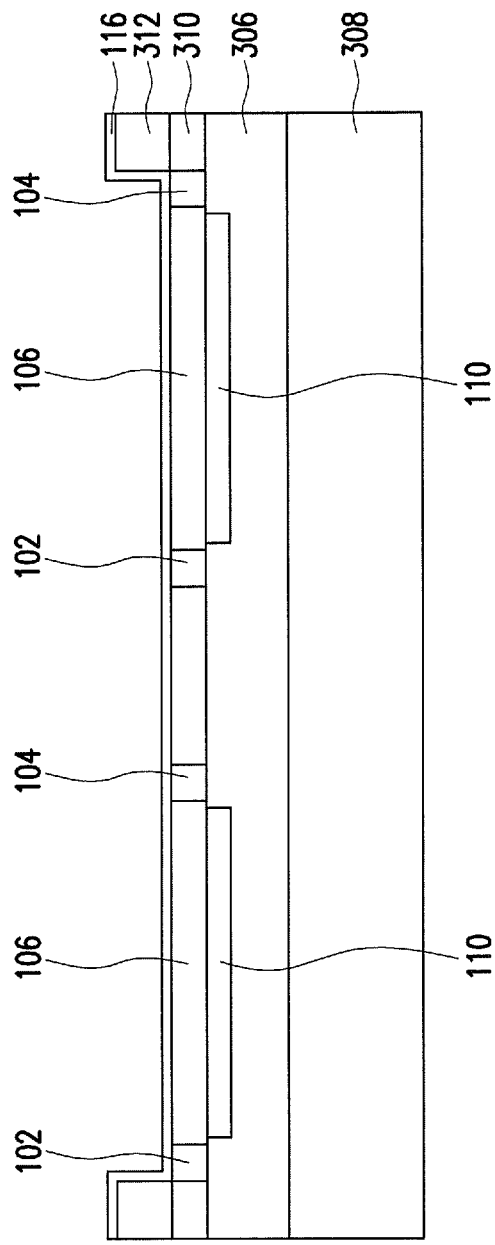

FIG. 8E illustrates a structure 837 resulting from deposition of the dielectric sensing film 116, in accordance with various embodiments. FIG. 8E may illustrate features of operation 808 of FIG. 8A. The dielectric sensing film 116 may be deposited using any suitable deposition process, such as chemical vapor deposition (CVD), physical vapor deposition (PVD), spin-on coating, and/or other suitable deposition technique. Accordingly, dielectric sensing film 116 may be disposed underneath a droplet and over the source region 102, channel region 106, and drain region 104.

Figure 8F:

FIG. 8F illustrates a top component 839, in accordance with various embodiments. The top component may include an oxide 630, top electrode 120, and glass substrate 632. FIG. 8F may illustrate features of operation 810 of FIG. 8A.

Figure 8G:
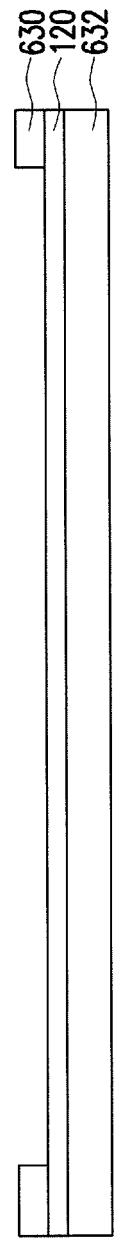

FIG. 8G illustrates a structure 841 with the oxide 630 of the top component etched, in accordance with various embodiments. FIG. 8G may illustrate features of operation 812 of FIG. 8A.

Figure 8H:
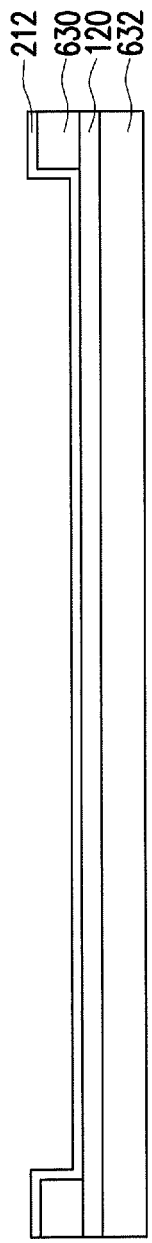

FIG. 8H illustrates a structure 843 with a deposition of the hydrophobic layer 212 over the top electrode 120 and the oxide 630, in accordance with various embodiments. FIG. 8H may illustrate features of operation 814 of FIG. 8A. In certain embodiments, the hydrophobic layer 212 may include a high K material.

Figure 8I:
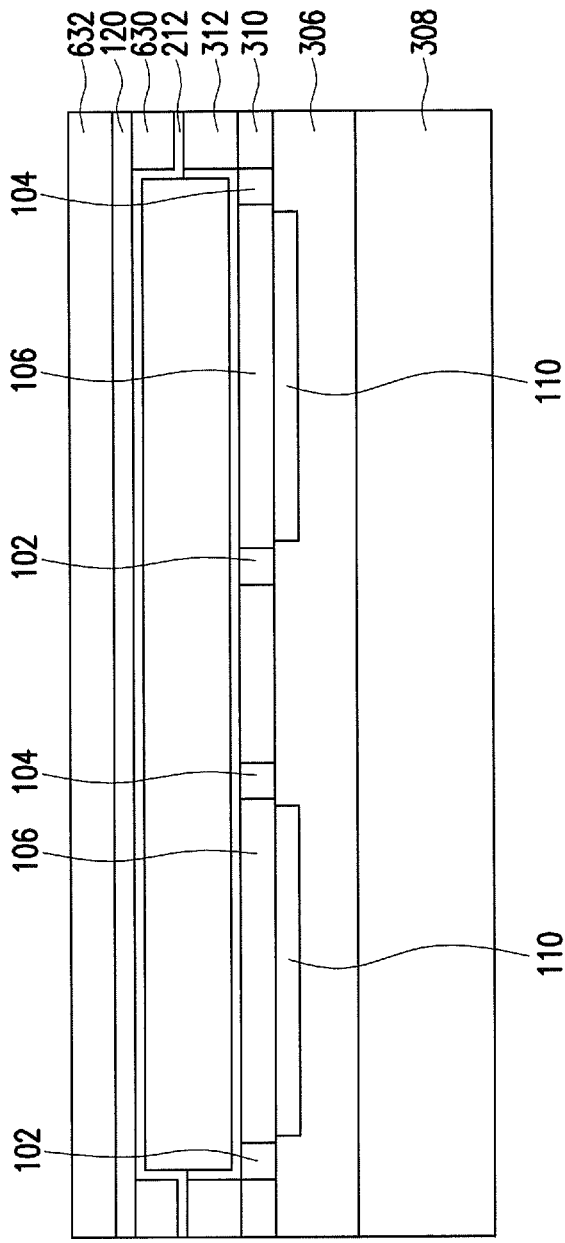

FIG. 8I illustrates a structure 845 with the processed top component flipped and bonded to the processed bottom component, in accordance with various embodiments. FIG. 8I may illustrate features of operation 816 of FIG. 8A. In certain embodiments, this bonding may be performed as a HfO2 to HfO2 fusion bonding.

Figure 8J:
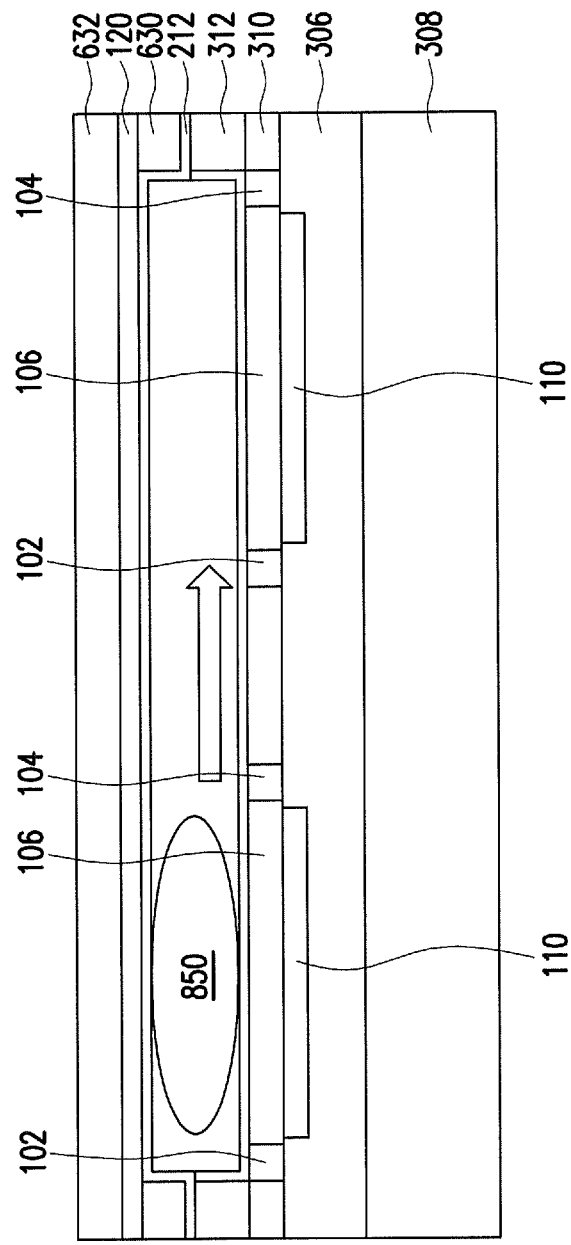

FIG. 8J illustrates a structure 847 with an injection of the liquid droplet 850, in accordance with various embodiments. FIG. 8J may illustrate features of operation 818 of FIG. 8A. The liquid droplet 850 may be manipulated when the integrated electrodes are in the electrowetting driving mode and sensor data may be collected based on the liquid droplet 850 when the integrated electrodes are in the bioFET sensing mode.

In an embodiment, a device includes: an electrode configured to change a contact angle of a liquid droplet above the electrode when a first voltage is applied to the electrode; a sensing film overlaying the electrode, wherein the electrode is configured for assessment of a state of the liquid droplet based on a second voltage sensed at the electrode; a reference electrode above the electrode, the reference electrode configured to provide a reference voltage; and a microfluidic channel between the electrode and the reference electrode, wherein the microfluidic channel is configured to manipulate the liquid droplet using the electrode.

In another embodiment, a device includes: an electrode array configured to change a contact angle of a liquid droplet above the electrode array when a first voltage is applied to the electrode array; and a sensing film overlaying the electrode array, wherein the electrode array is configured for assessment of a state of the liquid droplet based on a second voltage sensed at the electrode array.

In another embodiment, a method includes: providing a droplet from a first reservoir, wherein the first reservoir is coupled to a microfluidic grid; and transporting the droplet from the microfluidic grid into a microfluidic channel using an electrode array, wherein the electrode array is configured to change a contact angle of the droplet above an electrode of the electrode array when a first voltage is applied to the electrode, and wherein the electrode array is configured for assessment of a state of the droplet based on a second voltage sensed at the electrode of the electrode array.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A device comprising:
an electrode configured to change a contact angle of a liquid droplet above the electrode when a first voltage is applied to the electrode;
a sensing film overlaying the electrode, wherein the electrode is configured for assessment of a state of the liquid droplet based on a second voltage sensed at the electrode, wherein the sensing film comprises a selective binding agent configured to selectively bind with an analyte within the liquid droplet;
a reference electrode above the electrode, the reference electrode configured to provide a reference voltage;
a microfluidic channel between the electrode and the reference electrode, wherein the microfluidic channel is configured to manipulate the liquid droplet using the electrode; and
a transistor, wherein the transistor comprises the electrode and the second voltage is sensed between a drain and a source of the transistor.

2. The device of claim 1, wherein the first voltage is applied at a gate of the transistor.

3. The device of claim 1, wherein the electrode is part of an electrode array.

4. The device of claim 3, wherein different first voltages are applied at different adjacent electrodes of the electrode array.

5. The device of claim 1, wherein the sensing film is an ion sensing film configured to become charged when brought in proximity with an ion concentration within the liquid droplet to change a conductivity of the electrode.

6. The device of claim 1, wherein a hydrophobic coating covers the sensing film.

7. The device of claim 6, wherein the hydrophobic coating is a self-assembled monolayer or a polytetrafluoroethylene layer.

8. The device of claim 1, wherein the microfluidic channel is coupled to a plurality of reservoirs, wherein the microfluidic channel is configured for transport and mixing of fluids contained in the plurality of reservoirs, wherein the fluids include reagents.

9. A device comprising:
an electrode array configured to change a contact angle of a liquid droplet above the electrode array when a first voltage is applied to an electrode of the electrode array;
a sensing film overlaying the electrode array, wherein the electrode array is configured for assessment of a state of the liquid droplet based on a second voltage sensed at the electrode array, wherein the sensing film comprises a selective binding agent configured to selectively bind with an analyte within the liquid droplet; and
a transistor, wherein the transistor comprises the electrode and the second voltage is sensed between a drain and a source of the transistor.

10. The device of claim 9, wherein the electrode array comprises a plurality of electrodes configured to transport the liquid droplet from one end of the electrode array to another end of the electrode array.

11. The device of claim 9, wherein the device further comprises:
a reference electrode above the electrode array, the reference electrode configured to provide a reference voltage.

12. The device of claim 11, wherein a microfluidic channel in which the liquid droplet is manipulated is between the electrode array and the reference electrode.

13. The device of claim 12, wherein the microfluidic channel is coupled to a plurality of reservoirs, wherein the microfluidic channel is configured for transport and mixing of fluids contained in the plurality of reservoirs, wherein the fluids include reagents.

14. The device of claim 9, wherein different first voltages are applied at different adjacent electrodes of the electrode array.

15. A method, comprising:
providing a droplet from a first reservoir, wherein the first reservoir is coupled to a microfluidic grid; and
transporting the droplet from the microfluidic grid into a microfluidic channel using at least one electrode, wherein the at least one electrode is configured to change a contact angle of the droplet above the at least one electrode when a first voltage is applied to the at least one electrode; and
providing a sensing film overlaying the at least one electrode, wherein the at least one electrode is configured for assessment of a state of the liquid droplet based on a second voltage sensed at the at least one electrode, wherein the sensing film comprises a selective binding agent configured to selectively bind with an analyte within the liquid droplet; and
applying a voltage to the at least one electrode and sensing the second voltage at the at least one electrode.

16. The method of claim 15, wherein the sensing film is an ion sensing film configured to become charged when brought in proximity with an ion concentration within the liquid droplet to change a conductivity of the at least one electrode.

17. The method of claim 15, further comprising:
providing a reagent droplet from a reservoir coupled to the microfluidic grid; and
mixing the droplet and the reagent droplet in the microfluidic grid to form a prepared sample droplet.

18. The method of claim 17, wherein transporting the droplet from the microfluidic grid into the microfluidic channel comprises transporting the prepared sample droplet into the microfluidic channel.

19. The method of claim 15, wherein the at least one electrode comprises an electrode array.

20. The method of claim 15, wherein different first voltages are applied at different adjacent electrodes of the electrode array.

* * * * *